United States Patent [19]

Pelly et al.

[11] 4,013,937
[45] Mar. 22, 1977

[54] NATURALLY COMMUTATED CYCLOCONVERTER WITH CONTROLLED INPUT DISPLACEMENT POWER FACTOR

[75] Inventors: Brian R. Pelly, Lingfield, England; Laszlo Gyugyi, Penn Hills Township, Pa.

[73] Assignee: Westinghouse Electric Corporation, Pittsburgh, Pa.

[22] Filed: Oct. 9, 1975

[21] Appl. No.: 593,813

Related U.S. Application Data

[63] Continuation-in-part of Ser. No. 490,640, July 22, 1974, abandoned.

[30] Foreign Application Priority Data

July 22, 1975 France .............................. 75.22821

[52] U.S. Cl. .................................. 321/7; 323/102; 323/123; 321/69 R
[51] Int. Cl.² ...................... H02M 5/27; H02J 3/18
[58] Field of Search .................... 321/7, 66, 69 R; 323/101, 102, 105, 108, 119, 121, 123, 127, 128; 318/171, 179

[56] References Cited

UNITED STATES PATENTS

| 3,829,759 | 8/1974 | Thorborg | 323/102 |
| 3,858,105 | 12/1974 | Gyugyi | 321/66 |
| 3,959,719 | 5/1976 | Espelage | 321/7 |
| 3,959,720 | 5/1976 | Bose et al. | 321/7 |

Primary Examiner—William H. Beha, Jr.
Attorney, Agent, or Firm—C. M. Lorin

[57] ABSTRACT

A naturally commutated cycloconverter having at the input a source of higher frequency than at its output is used as a static reactive power generator to correct displacement angle in an alternating current power system when coupled thereto at the output. Reactive power correction is obtained with such "high frequency link" by automatically controlling the output voltage of the cycloconverter so as to deviate by a required amount from the AC power system voltage. At the same time, a circulating current is established between the positive and negative banks of thyristors of the cycloconverter of such a magnitude as to compensate for the variations of the lagging quadrature component of the input current of the cycloconverter caused by output current variations, thereby permitting optimization of the high frequency link.

The concept of generating controllable reactive power with a naturally commutated cycloconverter is used (1) with one cycloconverter as a controllable source of reactive power coupled to a power system; (2) with two cycloconverters tying a power system with a load, or two power systems together. In either instance, the output voltage of the cycloconverter is controlled for automatic compensation in the line power factor, and concurrently a circulating current is established in the single or in the two cycloconverters for automatic correction against variations in the lagging current at the cycloconverter input when the load conditions at the output thereof vary.

12 Claims, 40 Drawing Figures

NATURALLY COMMUTATED CYCLOCONVERTER WITH CONTROLLED INPUT DISPLACEMENT POWER FACTOR

CROSS-REFERENCE TO OTHER PATENT APPLICATIONS

This is a continuation-in-part of application Ser. No. 490,640, filed July 22, 1974 by the same applicants, and which is now abandoned.

BACKGROUND OF THE INVENTION

A naturally commutated cycloconverter is a static device for changing electrical power from one frequency to another. An inherent characteristic of such a cycloconverter is that the displacement angle of the current drawn at the input is lagging and is a function of the displacement angle of the output current. This characteristic is often acceptable, but for some applications it would be beneficial if the reactive current at the input could be controlled independently of the amplitude and phase of the current at the output.

This has been accomplished in the prior art, such as shown by U.S. Pat. No. 3,742,336, by connecting an external variable reactive power device across the input terminals and including back-to-back thyristors which are phase controlled to provide whatever net reactive current is required at the input, such as disclosed in the published article appearing in POWER for April 1973, at pages 69–71, irrespective of the output loading conditions of the cycloconverter. A fixed capacitor provides a fixed amount of leading reactive power from which is cancelled a lesser or greater extent of lagging reactive power drawn by the parallel connected variable inductor, when the cycloconverter experiences variable load conditions.

There has been in recent years an increased demand for power factor correction and control in utility and industrial power systems due to growing use of electrical machines, the major role of the electric arc furnace in steel production and the general acceptance of thyristor drives and power controllers in the industry. As a result, controlled generation of reactive power for improving the line power factor has become of major importance. This can be achieved most successfully through the use of static power switches, for instance thyristors. Traditionally, rotating synchronous condensers have been used for this purpose. It has been established, however, that static VAR generators in most applications provide superior performance at lower cost than conventional rotating synchronous condensers.

There are three basic modern methods of generating reactive power (VAR) all using static control of thyristors: (1) thyristor controlled shunt capacitors and inductors; (2) AC/DC converters and inverters; (3) AC/AC frequency changers.

The present invention relates to the third category of static VAR generators, namely to AC/AC frequency changers used for the generation of reactive power.

The AC/AC frequency changer is itself divided into several categories according to the mode of control, the range of control, and the inherent properties of the apparatus in operation. A basic distinction is made between frequency changers in which the thyristors are force commutated and those in which the thyristors are naturally commutated by the voltages of the input source.

The present invention relates to naturally commutated AC/AC frequency changers or cycloconverters.

Two inherent characteristics of a frequency changer using thyristors for conversion are: (1) the frequency relation between the input alternating current and the output alternating current; and (2) the phase relation between current and voltage at the input and at the output, i.e., the relationship between the input and output displacement power factors. In naturally commutated cycloconverters the input displacement power factor is lagging and is a function of the displacement power factor of the output current. It is possible by force commutation to control the input displacement power factor and in particular, to bring it automatically to unity. This is not possible with a naturally commutated frequency changer. Another particularity of frequency changers is that an alternating sinusoidal wave of a desired frequency is generated by controlled conduction of the thyristors. The time and frequency of conduction of the thyristors is generally variable along the reference waveform used to build the output waveform.

Static frequency changers offer a unique mode of generating reactive power. In that respect they provide an interesting alternative for AC/DC converters, and for inverters, which also are capable under proper operative conditions of generating reactive power. In all such instances, practically the reactive power generator must be operated in an essentially balanced multiphase system. However, these types of generators not only perform generally as well as any rotating synchronous condensers under steady state conditions, but also have proved to be superior for transient response.

In the U.S. Pat. No. 3,858,105 of Laszlo Gyugyi reference has been made to an original concept by B. R. Pelly of a high frequency link consisting of a cycloconverter and a high frequency source of reactive power naturally commutating the cycloconverter for providing, in relation to a power system connected at the output of the cycloconverter, power factor correction by control of the cycloconverter.

In the above-mentioned Gyugyi patent it is also stated that the cycloconverter has at the input an inherent lagging component of current, similar to that drawn by an inductance. This lagging input current varies with the output load, so that the frequency of the reactive power source provided by a tuned L-C circuit, required for natural commutation of the cycloconverter, varies. Therefore, a higher VA rating is required from the L-C tuned circuit reactive source in order to keep its frequency variations small under varying load conditions. In the patent, the proposition is made to use two cycloconverters properly controlled to create a system equivalent to one cycloconverter in which the load variations do not affect the lagging input power factor exhibited by the two cycloconverters. The present invention proposes to achieve a similar result by establishing and controlling a circulating current between banks of one or two cycloconverters.

SUMMARY OF THE INVENTION

A direct voltage bias is applied to the firing angle control circuit of one, or two, naturally commutated cycloconverters so as to establish a circulating current between the positive and negative banks thereof, of such magnitude that the lagging input current is varied in relation to variations in the load at the output.

The invention may take two aspects depending upon whether two cycloconverters are used for interlinking two power systems (or one power system and a load), or a single cycloconverter is connected to one power system. In either instance, a high frequency source is connected at the input of the cycloconverter for natural commutation thereof. The high frequency source is common to both cycloconverters when two are used.

The present invention enables the use of a high frequency generator of optimum VA rating by keeping the reactive power demand of the cycloconverter(s) constant.

When one cycloconverter is used as a controllable source of reactive power, the invention resides in a static reactive power generator for supplying variable reactive power to an alternating current power system, comprising: (1) a frequency converter having positive and negative banks of controllable rectifiers; (2) a source of reactive power at the input operative at a frequency which is higher than the frequency of the AC power system for naturally commutating the rectifiers; (3) controlling means for the output voltage of the frequency converter to adjust the amount of reactive power provided for to the AC power system; and (4) means for controlling the rectifiers to generate circulating current between the positive and negative banks so as to maintain the lagging quadrature current in the input of the frequency converter at a predetermined value independently of the reactive power provided in the AC power system.

THE NOVEL CONCEPT OF CONTROLLING THE INPUT CURRENT LAG OF A NATURALLY COMMUTATED CYCLOCONVERTER

Figure 1:
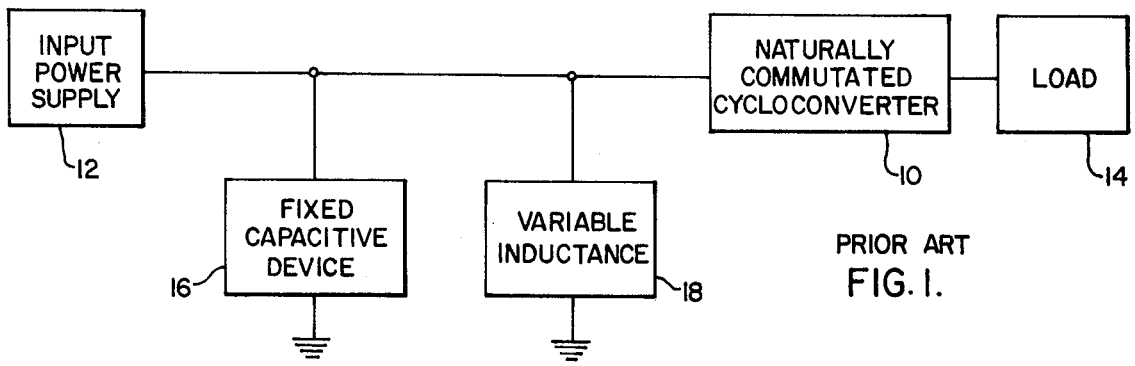
In FIG. 1 there is diagrammatically shown a prior art arrangement for correcting the power factor of a cycloconverter connected between an input power supply and a load.

In FIG. 1 there is shown an example of the prior art approach for correcting the power factor of a cycloconverter 10 operatively connected between an input power supply 12 in a load 14. The cycloconverter 10 can be considered as a variable lagging load, in effect comprising a varying resistance representing the power component of the load and a varying inductance in parallel with the resistance, with the varying resistance and inductance depending upon the load conditions at the output of the cycloconverter. Normally, in order to correct the equivalent inductance of the cycloconverter 10, a fixed capacitive device 16 would be connected of such capacitance as to balance out the equivalent inductance of the cycloconverter 10. Thus, a unity power factor operating condition could be achieved. In practice, because the load 14 at the output of the cycloconverter 10 normally changes during the course of operation, the equivalent variable inductance as seen from the input of the cycloconverter 10 changes in value also. A variable capacitor would then be required in order to cancel out the varying inductance of the cycloconverter. One way to obtain an effectively varying capacitor would be to provide a fixed capacitor such as 16 in combination with a variable inductance 18, which would cancel the capacitor 16 to a greater or lesser extent as required.

Figure 2:
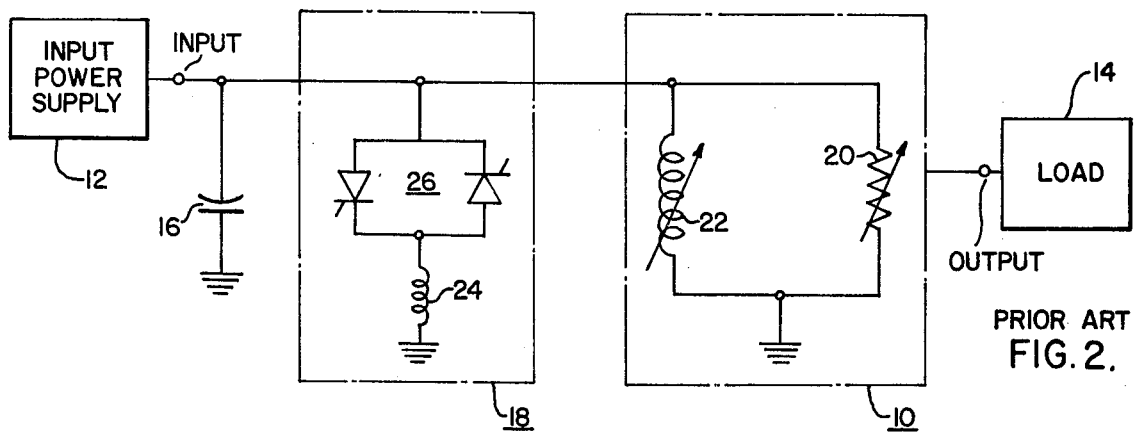
In FIG. 2 there is schematically shown the power factor correction arrangement of FIG. 1.

In FIG. 2 the systems elements shown in FIG. 1 are shown in greater detail such that the cycloconverters 10 are shown to include an equivalent variable resistor 20 and an equivalent variable inductance 22, with the resistor 20 representing the variable power component of the load 14 and the variable inductance 22 depending upon the load condition at the output of the cycloconverter. The variable inductance 18 is shown to include a fixed inductor 24 operative with thyristors 26 for controlling the effective inductance of the inductor 24 is relation to the fixed capacitance 16, such that the latter provides fixed leading VARS in relation to the effective lagging power factor of the current drawn at the input of the cycloconverter 10. In this way, a fixed input power factor is provided for the cycloconverter as viewed by the input power supply 12.

Figure 3:
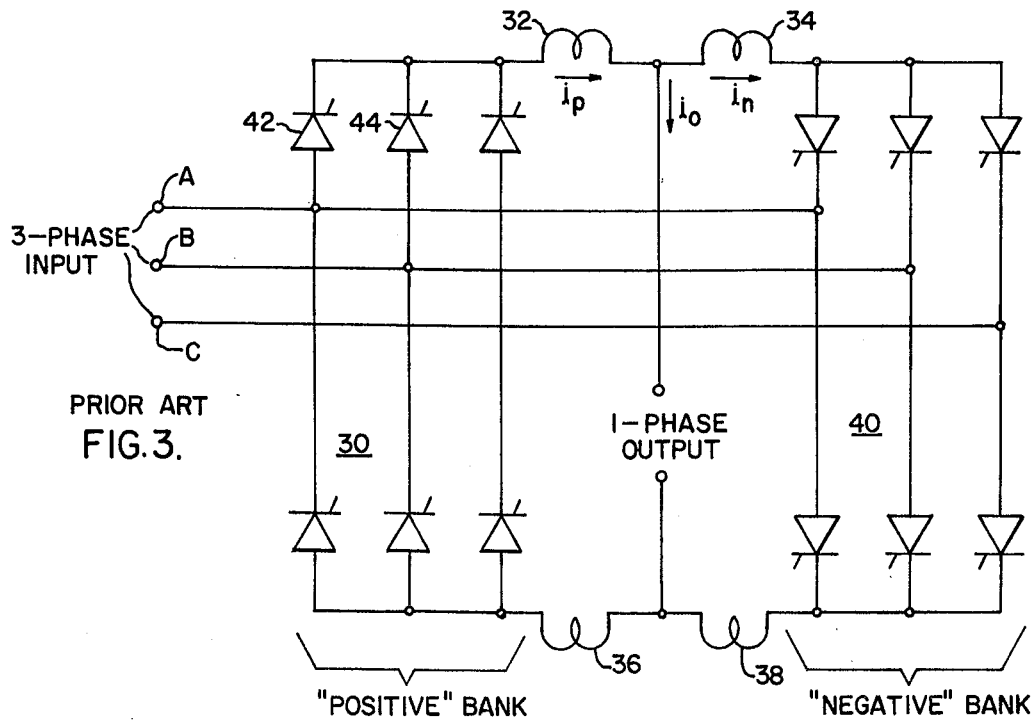
In FIG. 3 there is shown the well known circuit arrangement of the positive bank of thyristors and the negative bank of thyristors of a naturally commutated cycloconverter.

As shown in FIG. 3, a naturally commutated cycloconverter includes a positive bank of thyristors 30 and a negative bank of thyristors 40, with the particular circuit shown in FIG. 3 providing a one-phase output from a three-phase input power supply. The positive bank of thyristors 30 carries the positive output current and the negative bank 40 carries the negative output current. The control scheme for the cycloconverter may be arranged such that the negative bank 40 is blocked when the positive bank 30 carries the output current, and vice versa. It is also practical to fire both sets of thyristors 30 and 40 at the same time, in which event each bank carries a circulating component of current in addition to its share of the output current. Reactors 32, 34, 36 and 38 are inserted as shown between the two banks 30 and 40, to support the ripple voltage which inevitably appears between the positive and negative banks 30 and 40 to thereby limit the circulating ripple current to an acceptable level. This latter mode of operation is sometimes employed to obviate the problems otherwise associated with obtaining a smooth and substantially distortion-free crossover of the output current. Since the production of appreciable circulating current at full load is generally considered to be objectionable because it constitutes an additional load on the thyristors, as well as an additional lagging reactive load on the input lines, the control is usually arranged such that the angle of overlap between the firing pulses of the two banks is virtually zero at full output current and this angle is automatically increased until it eventually reaches a full 360° at reduced output current when the need to operate with circulating current becomes greater. With this type of control, the loading of the thyristors and supply lines at intermediate loads is kept to a level which is less than that obtained at full load. In the prior art, the operation of a naturally commutated cycloconverter has usually been with a circulating current between the positive and negative banks of the cycloconverter to obviate the difficulties of obtaining a good quality output wave. However, the circulating current by itself has been looked upon as being an undesirable side effect, and thus this current has usually been kept just to the minimum level that would permit the desired circuit operation.

A naturally commutated cycloconverter has the commutations of the current between the thyristors effected naturally by virtue of the alternating polarity of the applied input voltage. In other words, when the one thyristor is fired to turn it on, at the same time this turns off the preceding thyristor because the input voltage is instantaneously of such polarity to switch off the thyristor that was previously conducting. This relates to the commutation within a given negative or positive bank. For example, in reference to FIG. 3, if the top left thyristor 42 is now conducting and it is desired to shift the current conduction from the thyristor 42 to the top middle thyristor 44, this requires the firing of the thyristor 44 so the current flows in the top middle thyristor 44 and at that time the polarity of the voltage between the two terminals will be such that the firing of the thyristor 44 will apply a reverse voltage across the previously conducting thyristor 42 such that the current flow through the thyristor 42 commutates naturally. The operating principle of natural commutation is well known in the art and is described in a book entitled "Thyristor Phase-Controlled Converters and Cycloconverters" by B. R. Pelly, published in 1971 by John Wiley and Sons, and more specifically in Chapter 3 with respect to a very simple circuit on pages 27–32. The basic function of a naturally commutated cycloconverter is to convert from one frequency to another frequency, with the output frequency being less than the input frequency. A basic property of a cycloconverter is that it always appears to the input power supply to which it is connected as a lagging load, regardless of whether the particular load connected to the output of the cycloconverter is resistive, capacitive or inductive. The equivalent load including the cycloconverter as seen by the input power supply turns out to be lagging and inductive. Furthermore, the amount of lagging load reflected by the cycloconverter 10 to the input power supply 12 depends upon the actual load condition at the output of the cycloconverter 10, such as the amount of actual load and the phasing of the actual load which is discussed in detail in the above-referenced book at pages 160–180. The signal waveforms that explain this effect, for example, are set forth on pages 169–172 of the above book for various different actual loads at the output of the cycloconverter 10. The signal waveforms show that for all types of loads the input current is lagging the input voltage by a varying amount depending upon the particular load at the output of the cycloconverter.

The current which circulates between the positive and negative thyristor banks manifests itself in the input side of the naturally commutated cycloconverter as a lagging reactive component, and in accordance with the teachings of the present invention, the input displacement factor of the cycloconverter is controlled by regulating the amplitude of the direct component of the current which circulates between the two converter banks so as to produce whatever reactive current is desired at the input of the cycloconverter. In general, this will call for a greater level of circulating current than is required for the purpose of producing a good output waveform and thus the control scheme will generally be compatible with the waveform control requirements. The amplitude of the direct component of circulating current can be controlled by introducing the small direct voltage difference between the positive and negative converters through application of suitable controlled direct bias voltages to the firing angle control circuits. Since the direct component of circulating current is limited only by the relatively small resistance of the circulating current reactors plus any stray circuit resistance, only a relatively small biasing of the converter firing angles is necessary to provide the required level of circulating current. This can produce only a variable lagging current at the input of the cycloconverter, and if it is desired to provide either a net leading or net lagging power factor, depending upon the particular application requirements, a fixed static capacitor can be connected across the input terminals of the cycloconverter and the amplitude of the circulating current can then be controlled as required to cancel the fixed leading reactive component consumed by the capacitor to a lesser or greater extent, as desired.

The present invention is directed to modifying the power factor of the naturally commutated cycloconverter as seen by the input power supply so that the input power factor can be controlled at will, and could, for example, be kept substantially constant. The power factor can be made to be unity or even leading by the teachings of the present invention. The basic principle here involved is illustrated by the waveforms shown in FIG. 4. It is assumed that the fixed capacitors are connected across the input lines of the three-phase to one-phase cycloconverter as shown in FIG. 3, and that the output voltage and current remain fixed in amplitude and phase relationship as the net input displacement factor is controlled from leading through unity to lagging. In curve 4A the waveform is shown of the cycloconverter output voltage when the cycloconverter is operating with no circulating current between the respective positive bank and negative bank of the cycloconverter, with the conductive angles of the positive and negative thyristor banks not overlapping one another. The fixed capacitor current overcompensates the lagging reactive component drawn by the naturally commutated cycloconverter, and the net fundamental component of current at the input is leading. The curve 4E illustrates the output voltages of the positive and negative banks of the naturally commutated cycloconverter with the angle of conduction overlap of the positive and negative banks being increased to a full 360° and the current carried by each bank being just continuous. The positive bank curreng $i_p$ as illustrated in FIG. 3 is determined by the relationship $$i_p = \frac{\hat{I}_o}{2} + \frac{\hat{I}_o}{2} \sin \omega_o t. \tag{1}$$

The negative bank $i_n$ is determined by the relationship $$i_n = \frac{\hat{I}_o}{2} - \frac{\hat{I}_o}{2} \sin \omega_o t. \tag{2}$$

The output current $i_o$ is determined by the relationship $$i_o = i_p - i_n = \hat{I}_o \sin \omega_o t, \tag{3}$$

where $i_p$ is the instantaneous current of the positive bank, $i_n$ is the instantaneous current of the negative bank, $_o$ is the instantaneous output current, $\hat{I}_o$ is the peak output current and $\omega_o$ is the angular output frequency. The lagging component of current drawn by the cycloconverter itself is now greater than the showing of curve 4A, and in fact is now just sufficient to cancel the fixed leading current drawn by the capacitors and the net input displacement factor is unity.

For an increased circulating current operating condition, as shown by curves 4I through 4K, the steady component of circulating current caried by each bank is double that illustrated in curves 4F through 4H and is determined for the positive bank by equation $$i_p = \hat{I}_o + \frac{\hat{I}_o}{2} \sin \omega_o t \tag{4}$$

and for the negative bank is determined by equation $$i_n = \hat{I}_o - \frac{\hat{I}_o}{2} \sin \omega_o t. \tag{5}$$

The lagging component of current drawn at the input terminals of the cycloconverter due to the circulatory current is double that shown by the waveform 4H and the resulting net input displacement factor is lagging.

In general, for continuous conduction in both banks of thyristors, it can be shown that the rms inphase and quadrature components of current at the cycloconverter input terminals, $I_{power}$ and $I_q$, respectively, are given by the relationship $$I_p = gs \frac{r\sqrt{3}}{2\pi} I_o \cos \phi_o, \tag{6}$$

where $g$ is the number of output phases, $s$ is the number of three-phase groups connected in series in each cycloconverter circuit such that $s = 2$ for the bridge circuit shown in FIG. 3, $r$ is the ratio of the actual output voltage to maximum possible output voltage and $I_o$ is the rms output current, and the relationship $$I_q = gs \frac{2\sqrt{3}}{\sqrt{2}\,\pi} a_{10} I_c, \text{ where the value} \tag{7}$$

$$a_{10} = \frac{1}{2\pi} \int_0^{2\pi} \cos(\sin^{-1} r \sin \theta_o) d\theta_o, \tag{8}$$

where values for the quantity $a_{10}$ for different values of $r$ are tabulated on page 296 of the above reference book by Pelly, and $I_c$ is the steady component of circulating current. Since continuous conduction is assumed, $$I_c \geq \frac{I_o}{2}. \tag{9}$$

It is evident from the above relationships that by controlling the amplitude of $I_c$, the current $I_q$ can be controlled.

The waveforms of FIG. 4 demonstrate the possibility for controlling the net input displacement factor in both the leading and lagging directions, independent of the load at the output of the cycloconverter with no additional active power circuit elements. It should be noted that the waveforms shown in FIG. 4, which are in relation to a naturally commutated cycloconverter having a one-phase output, show a relatively high degree of distortion of the input current waves. In practice, for a three- (or multiple-) phase output, most of the distortion seen in these simple waveforms would cancel, so that the resulting net input current waveform would be practically sinusoidal, but still would have the same adjustable phase shift of the fundamental component illustrated in FIG. 4.

In the example chosen in relation to the waveforms shown in FIG. 4, the output load current is fixed and the current carried by the thyristors increases as the input displacement factor becomes more lagging. In general, the circulating current carried by a thyristor would be objectionable if it produced a total heating effect substantially greater than that produced just by the full load output current with no circulating current. Thus, in practice, it would be desirable to operate the cycloconverter so that little or no current circulates between the positive and negative banks at full load. Then, as the load is reduced, the circulating current can be increased to the extent necessary to provide whatever net reactive current is required at the input for that loading condition. Preferably, the net loading of the thyristors at reduced external loads would not exceed that obtained at full load.

A typical cycloconverter will be designed for a given rating of output current and under some conditions of operation, the cycloconverter will not be required to deliver that amount of output current. However, under the extreme operating condition, it will be delivering its full rated current and simultaneously drawing a full lagging component of current from the input power supply, which will be the worst case condition as far as the lagging current in relation to the input power supply 12. As the load at the output of the cycloconverter is decreased and correspondingly the load current in the output of the cycloconverter decreases, the corresponding lagging component of current at the input of the cycloconverter will also decrease so that the equivalent inductor 22 shown in FIG. 2 would correspondingly increase its value as the output load is decreased. In accordance with the teachings of the present invention, in order to keep the net quadrature current consumed by the cycloconverter at a substantially constant value, it is desired to maintain this equivalent inductor 22 at its lowest value regardless of the output current being delivered by the cycloconverter. When the full output current is being provided by the cycloconverter, this inductor would have the same equivalent value as it does in the operation of a conventional cycloconverter. As the output current being supplied by the cycloconverter decreases, this equivalent inductor stays fixed at the level which is appropriate to the maximum amount of current even though the maximum current is no longer being drawn from the output of the cycloconverter. Thusly, in effect, a constant equivalent shunt inductance is provided regardless of the load at the output of the cycloconverter, and therefore this constant equivalent shunt inductance can be corrected by a provided fixed capacitor. It should be noted that minimum inductance is related to maximum inductive current, which means maximum capacitive current would be provided. The present invention provides an internal control of the thyristors in the respective positive bank and negative bank of the cycloconverter such that as viewed from the input power supply, this equivalent shunt inductance remains substantially constant.

There are basically two ways for operating a naturally commutated cycloconverter, which comprises two banks of thyristors, a positive bank and a negative bank. In the first mode of operation, referred to as the non-circulating current mode in accordance with waveform 4B shown in FIG. 4, the two banks are controlled such that when the current flowing into the load is positive, that current is supplied from the positive bank. Because the converters are unidirectional, the positive bank can only carry positive current; and when the output current is positive, the positive bank is made conductive and the firing signals are removed from the negative bank such that it is not conductive. When it is desired to supply negative current, the thyristors of the negative bank are fired and made to be conductive, and the positive bank of thyristors is not provided with firing signals such that it is not conductive.

Figure 4A:
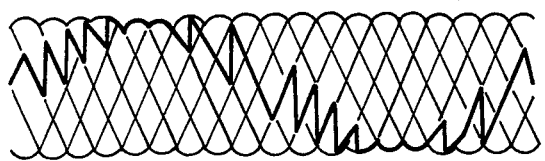
In FIGS. 4A to 4K there are shown waveforms to illustrate the no-circulating current, the just-continuous circulating current and the increased circulating current conditions of operation of the here described apparatus.
Figure 4B:
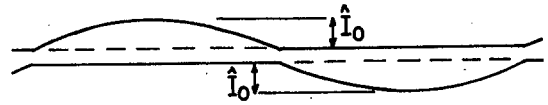
Figure 4C:
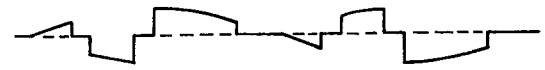
Figure 4D:
Figure 4E:
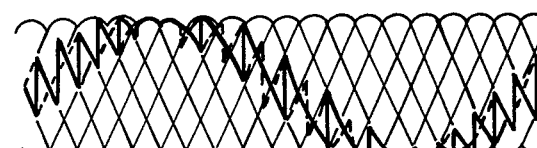
Figure 4F:
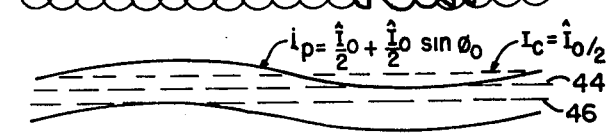
Figure 4G:
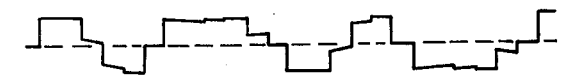
Figure 4H:

A second mode of operation is the circulating current mode in accordance with the waveforms 4I and 4F shown in FIG. 4, wherein both the negative bank and the positive bank converters are fired all of the time regardless of the direction of the flow of the load current, and the load current flows in each bank in conjunction with the circulating current which circulates between the negative and the positive bank of thyristors. The load current by itself accounts for a lagging reactive current component as seen by the input power supply, but the circulating current also accounts for a second lagging reactive current component as viewed by the input power supply. Therefore, by controlling the circulating current independently of the load current, it is practical to control the net effective inductance of the cycloconverter as seen by the input power supply to have a substantially constant value. It should be realized that there is a first component of quadrature or lagging current due to the load and in addition a second component of quadrature current which is due to the circulating current flowing between the negative and the positive banks of thyristors of the cycloconverter, with both the first component and second component of quadrature current having the same polarity but they could have a different amplitude. Thusly, as shown in FIG. 5 of the drawings for the purpose of illustration, the cycloconverter input current is made up of an in-phase power component $I_{power}$ and a first component of quadrature current $I_{qL}$ due to the load and a second component of quadrature current $I_{qcc}$ which is due to the circulating current flowing between the positive and negative banks. The two quadrature currents will add together to be equal to the total quadrature current $I_q$ flowing at the input of the cycloconverter. As the load 14 connected to the output of the cycloconverter 10 changes, the in-phase component of input current $I_{power}$ will also change, and correspondingly the quadrature current component $I_{qL}$ due to the output load changes. As the current component $I_{qL}$ changes in one direction, the current component $I_{qcc}$ due to the circulating current is correspondingly changed in the opposite direction such that the sum $I_q$ of the two component currents $I_{qL}$ and $I_{qcc}$ remain substantially constant or at a controlled magnitude as may be desired. This control operation takes care of changing load conditions at the output terminals of the cycloconverter 10.

For the purpose of illustration, a typical load application would be to drive an induction motor load or a synchronous motor load. To vary the speed of the motor in an efficient manner, the frequency and amplitude of the voltage supplied to the motor are controlled. One way of doing this is with a cycloconverter operative with the 60-cycle input power supply for providing at the output of the cycloconverter an output frequency varying from zero up to about 40 Hz. The magnitude of the output load current is essentially independent of output frequency, but rather depends on the torque demand on the motor. To change the speed of the AC motor, the frequency of the output current is changed, but that in itself will not change the magnitude of the current flowing in the output. In fact, if a constant torque operation of the motor were desired regardless of frequency, then the current in the output of the cycloconverter would stay substantially fixed at all speeds of the motor. However, this does not mean that the corresponding input current will stay fixed, for the reason that as the output frequency is changed, the output voltage is simultaneously changed.

In relation to the input current supplied to the cycloconverter, there are two components of lagging input current. One component, $I_{qL}$, is due to the load and cannot be independently controlled because it is a function of the load, but the other component, $I_{qcc}$, is controllable and is due to the amount of current that is allowed to circulate between the two banks of the cycloconverter. The waveform shown in FIG. 4A is representative of the cycloconverter output voltage under no circulating current mode of operation for the full output load condition, when the load impedance is such that the cycloconverter is supplying full rated current to the load. Under that condition, no current is circulating between the negative bank and the positive bank converters such that $I_{qL}$ is at a maximum value and $I_{qcc}$ is zero and $I_{power}$ is at its maximum value. The current waveforms in FIG. 4B show that during the positive half cycle of output load current, the positive converter is in conduction and the negative converter is blocked and not providing load current. During the negative half cycle of output load current, the negative converter is in conduction and the positive converter is blocked. The waveform shown in FIG. 4C illustrates the current drawn by the cycloconverter input line A from the input power supply. The waveform shown in FIG. 4D illustrates the voltage and net current of input line A of the cycloconverter, assuming that a fixed capacitor is connected across the input of the cycloconverter such as illustrated by FIG. 2 and the net fundamental component of current at the input of the cycloconverter is shown leading the voltage because of the presence of that capacitor. Since there is no circulating current to be controlled, the phase of the input current would not be kept in the same relationship to the input voltage when the load is varied.

For a fixed load condition at the output of the cycloconverter, by varying the circulating current, it is practical to obtain a varying lagging current at the input. For a varying load condition at the output of the cycloconverter, by varying the circulating current, it is practical to obtain a substantially fixed lagging current at the input. For each of the latter load conditions, a capacitor can be provided at the input to overcorrect the lagging current component at the input and make it a leading current component at the input of the cycloconverter. The amplitude of the circulating current can be controlled by selected firing of the thyristors in the respective negative bank and positive bank converters of the cycloconverter such that the effective inductance remains the same and fixed as the output load changes. In relation to the waveforms shown in FIG. 4E to illustrate the output voltages of the positive and negative bank converters, the respective converters are fired all of the time so that each produces the same fundamental component of output voltage as illustrated at page 157 of the above reference book by Pelly. Since both converters are in conduction all the time, the positive bank current $i_p$ is shown by the top waveform of FIG. 4F and the negative bank current $i_n$ is shown by the bottom waveform of FIG. 4F. Each current wave is just continuous in operation with the upper heavy dotted line 44 representing zero for the positive bank current and the lower heavy line 46 representing zero for the negative bank current. Thusly, both the positive and negative bank currents just reach zero momentarily during the course of the respective half cycles, and for this reason, this is referred to as just continuous operation because there is always current flowing in both banks although at one specific point in each cycle, the current just reaches zero. The amplitude of the output current $i_o$ is the difference between the positive bank current and the negative bank current as shown in FIG. 4F, with the same outward current $i_o$ being provided in relation to FIG. 4F as was provided in relation to the waveforms shown in FIG. 4B. The input current waveform shown by FIG. 4G is now changed in relation to the input current waveform shown by FIG. 4C, because the converter current waveforms themselves have changed. If the dotted fundamental component were drawn in relation to the waveform of FIG. 4G, it could be shown that it is more lagging than the dotted fundamental component in relation to the waveform shown in FIG. 4C. Because it is assumed a fixed value of capacitance is connected across the input of the cycloconverter, the net sum of that capacitive current plus the current shown in FIG. 4G results in the dotted fundamental component of current shown in FIG. 4H being in phase with the voltage. For the same amount of output current, the cycloconverter has moved from a leading current condition at the input to a current condition in phase with the voltage, and this is done by operating the negative bank converter and the positive bank converter in a different mode. In relation to the voltage and net current waveform shown in FIG. 4D, they are operated with no circulating current and in relation to the voltage and net current waveform shown in FIG. 4H, they are operated with a just continuous circulating current condition which has shifted the phase relationship angle.

Figure 4I:
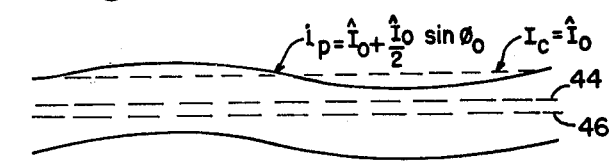
Figure 4J:
Figure 4K:
Figure 5:
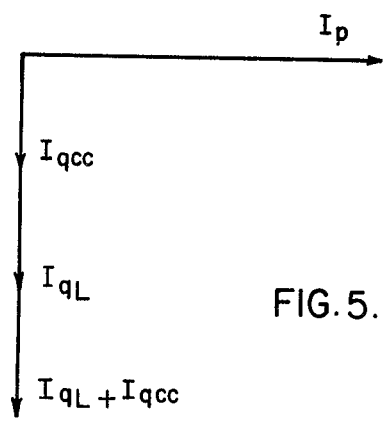
In FIG. 5 there is illustrated the typical vector diagram for the input current for a cycloconverter.

In FIG. 4I, the positive bank output current $i_p$ and the negative bank output current $i_n$ are shown for an increased circulating current condition of operation of the cycloconverter. The difference between the positive and negative converter output current relationships shown in FIG. 4F and the positive and negative converter output current relationships shown in FIG. 4I is that each of the respective output currents has been shifted in relation to the zero current reference such that the positive bank output current $i_p$ in FIG. 4I has been shifted upward in relation to the zero current reference 44 and the negative bank output current $i_n$ shown in FIG. 4I has been shifted downward relative to its zero current reference 46. The positive converter output current $i_p$ is more than just continuous as shown in FIG. 4I because its minimum value is above the zero reference, and the same is true in relation to the negative bank output current $i_n$. This condition of operation is accomplished by including a bias voltage in the form of a DC voltage component between the two converter banks to make the two current waveforms $i_p$ and $i_n$ as shown in FIG. 4I move apart so that each current waveform no longer hits its respective zero reference. The current drawn by the cycloconverter input line A for the increased circulating current condition of operation is shown in FIG. 4J, and the net input current waveform for line A in relation to the input voltage of the cycloconverter, which net input current waveform is the sum of the capacitor current waveform plus the cycloconverter current waveform, is now clearly lagging the voltage wave as shown in FIG. 4K. Thusly, it can be seen that with a fixed output current, by controlling the circulating current between the positive bank converter and the negative bank converter, the phase of the fundamental component of input current can be shifted from a leading condition, to being in-phase and to a lagging condition as may be desired. Thusly, the applied bias voltage can be increased to provide a lagging condition and the applied bias voltage can be decreased to bring the positive bank current and the negative bank current closer together such that a leading current condition is thereby obtained.

In general, to obtain the waveforms shown in FIGS. 4A through 4D, the firing pulses applied to the positive bank converter are applied during the positive cycle and the firing pulses are applied to the negative bank converter during the negative cycle. To obtain the waveform shown in FIGS. 4E through 4H, the firing pulses are applied continuously to both the negative bank and the positive bank all the time. To obtain some intermediate condition of operation between the condition of continuous firing pulse overlap and the condition of no firing pulse overlap, the firing pulse control apparatus can be arranged such that there is some period of time when the firing pulses overlap and some period of time when just one bank is in conduction. A reference to the above book by Pelly at pages 190–198 will illustrate the operational principles here involved.

For the practical operation of the naturally commutated cycloconverter in accordance with the present invention, if it is desired to keep the effective power factor of the cycloconverter as seen by the input power supply substantially constant or at a controlled magnitude and whereby the effective inductive component of the cycloconverter is controlled as the output load changes, then the waveforms shown in FIGS. 4A to 4D could be provided for a maximum output load condition of operation, as the load current decreases, so the positive and negative converter firing pulses can be made to overlap one another, thus providing a sufficient circulating current to maintain the desired quadrature component of current at the input. As the load current further decreases, a point will be reached at which the firing pulses continuously overlap one another, and the circulating current is just continuous. Further decrease of load current would then be accompanied by introduction of an appropriate direct voltage bias between the positive and negative converters to further increase the circulating current and keep the net quadrature input current at a controlled magnitude. Thus, the cycloconverter operation would change from a full load and no circulating current condition of operation to a no load and full circulating current condition of operation.

Figure 6:
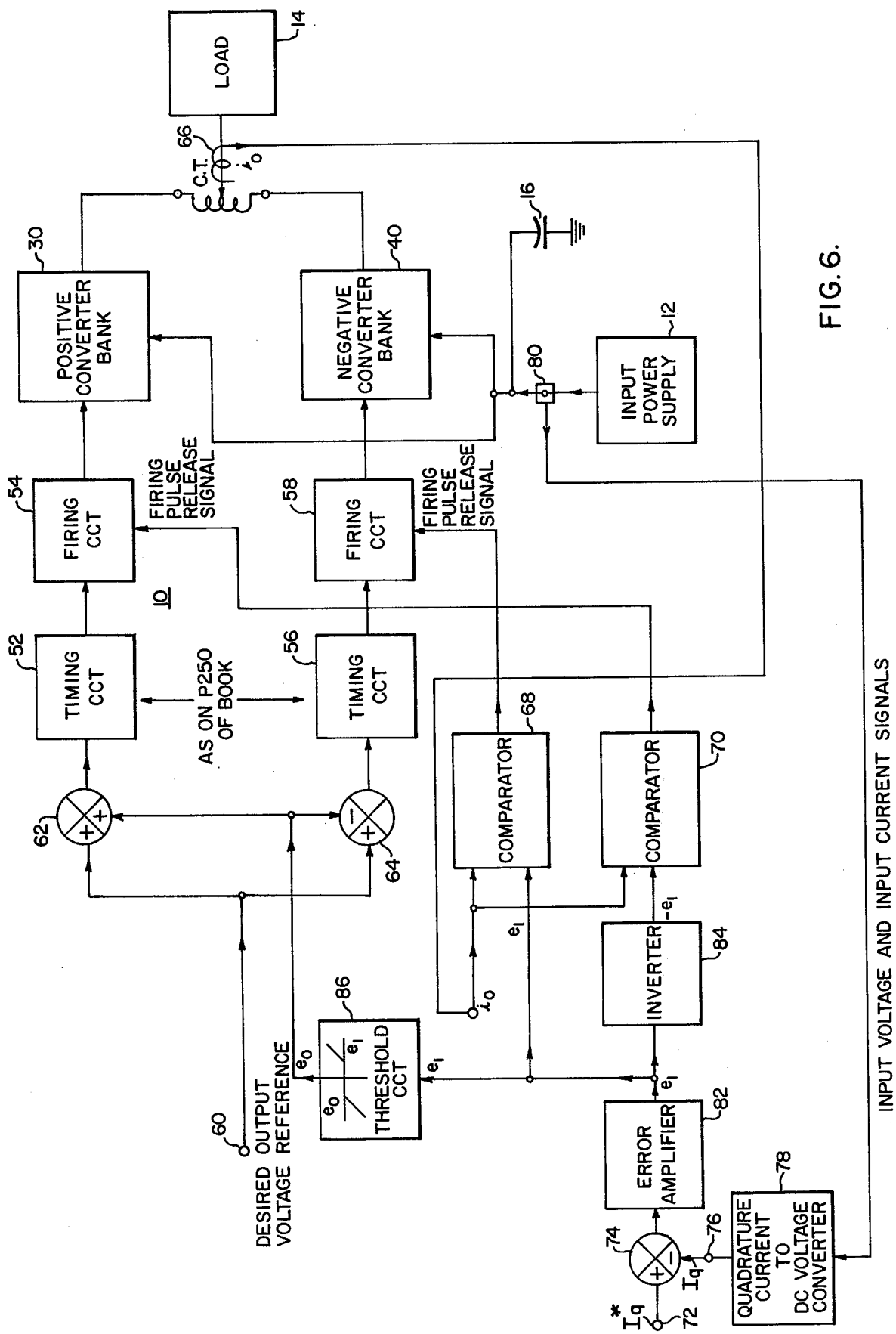
In FIG. 6 there is shown a feedback arrangement for controlling the amplitude of the quadrature current at the input of a cycloconverter in accordance with the present invention.

As shown in FIG. 6, a circulating current control circuit arrangement can be provided, whereby the input power supply 12 is operative with the positive converter bank 30 and the negative converter bank 40 to supply output current to a load 14 through a circulating current reactor 50. The positive converter bank 30 is controlled in its operation by a well-known arrangement of a timing circuit 52 operative with a firing circuit 54 for determining the conduction of the positive converter bank 30. Similarly, the negative converter bank is controlled in its operation by a well-known arrangement of a timing circuit 56 operative with a firing circuit 58, such as shown at pages 252 and 253 of the above reference book by Pelly. A desired output voltage reference, in relation to the output voltage and frequency desired for the load 14, is supplied to terminal 60 and to each of summing junctions 62 and 64 for determining the operation of the respective positive converter bank 30 and negative converter bank 40 in relation to the load 14. A current transformer 66 senses the output current $i_o$ supplied to the load 14 and applies a control signal in accordance with the output current $i_o$ to each of a comparator circuit 68 and a comparator circuit 70 for determining a firing pulse release signal to each of the firing circuits 54 and 58, respectively. A DC voltage in the form of a quadrature current reference signal $I_q^*$ is supplied to the terminal 72 operative with a summing junction 74 in conjunction with an actual quadrature current signal $I_q$ applied to terminal 76 by the quadrature current to DC voltage converter 78 in accordance with input voltage and input current signals supplied by suitable and well-known sensing devices 80 in relation to the input power supply 12. It should be understood that a current transformer and a voltage transformer can be utilized for the sensing devices 80. The quadrature current to DC voltage converter 78 is well known, and can be a multiplier responsive to the voltage signal and responsive to the current signal after a 90° phase shift, with the output signal passing through a smoothing filter.

A DC bias voltage error signal $e_1$ representing the error between the desired quadrature component input current and the actual quadrature component of input current is applied to the error signal amplifier 82 and then applied to a second input of the comparator 68 and passes through an inverter 84 and supplied to a second input of the comparator 70 for determining the operation of the respective firing circuits 54 and 58. In addition, the DC bias voltage error signal $e_1$ is applied through a threshold circuit 86 such that when it is above a predetermined threshold level, it is applied to the respective summing junctions 62 and 64 for controlling the operation of the respective timing circuits 52 and 56, and thereby the operations of the respective positive converter bank 30 and negative converter bank 40.

A controlled firing pulse overlap is determined by the operation of the comparators 68 and 70, until a full overlap of the firing pulses has been provided. Then, the threshold circuit 86 becomes operative to introduce a direct voltage bias between the two converter banks 30 and 40 for additional control of the converter operation.

A quadrature current reference signal $I_q^*$ is applied to terminal 72 according to the desired quadrature current $I_q^*$. The summing junction 74 compares the desired quadrature current reference $I_q^*$ with the actual quadrature current $I_q$ signal from the quadrature current to DC voltage converter 78, for establishing an error signal $e_1$. The error signal after amplification by high gain amplifier 82 is applied to comparator 68 for controlling the negative converter bank 40 and passes through inverter 84 for application to comparator 78 for controlling the positive converter bank 30. The threshold circuit 86 provides a deadband such that no output is obtained from the threshold circuit 86 until after the firing pulse overlap control of comparators 68 and 70 is completed to provide additional quadrature current. The direct voltage bias from the threshold circuit 86 is applied to the respective summing junctions 62 and 64 to increase the magnitude of the circulating current beyond the level of just-continuous operation and until an equilibrium is obtained with the desired quadrature current being supplied when the control system operation becomes stabilized. It should be noted that the gain of the error amplifier can be made high enough, including if desired some integration, such that an output signal will be provided from the threshold circuit 86 even when practically a zero error in the order of one-half percent or so condition of operation is obtained. When the cycloconverter is operating in the just-continuous condition of operation as shown in FIGS. 4E to 4H, with 100% overlapping firing pulses and both converters conducting all of the time, and it is desired to provide an additional circulating current, the amplitude of the circulating current can be increased by providing the DC bias voltage.

Figure 7A:
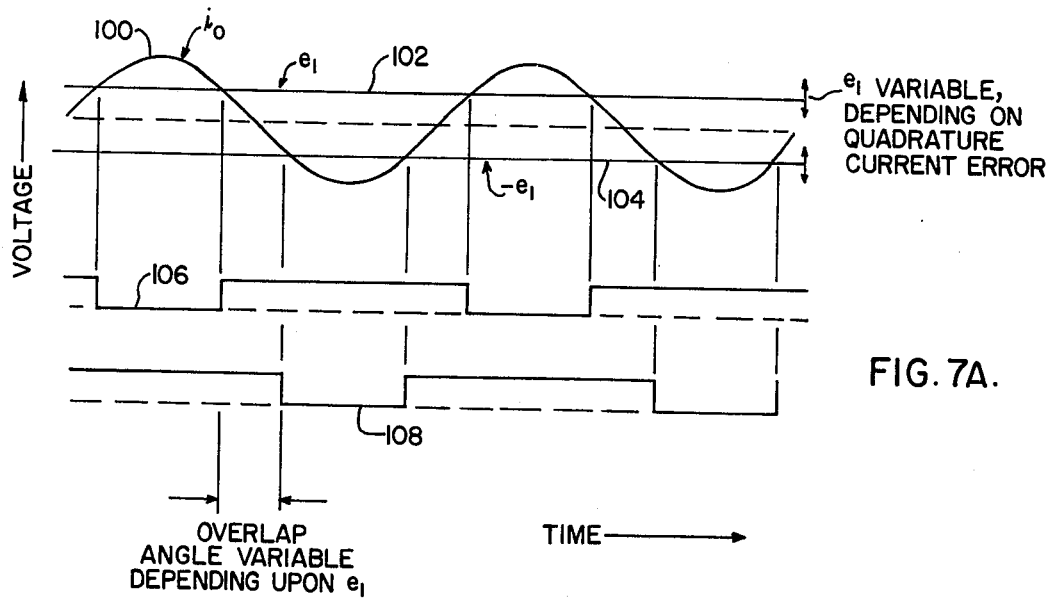
In FIGS. 7A and 7B there are shown control voltage waveforms determined by the bias voltage error signal provided in FIG. 6.

In FIG. 7A, there is shown the output current $i_o$ supplied to the load 14 as represented by the wave 100. The quadrature current error signal $e_1$ is shown by the voltage 102 and the inverted error signal $-e_1$ is shown by the voltage 104. The output signal from the comparator 68 is shown by the waveform 106 and the output signal from the comparator 70 is shown by the waveform 108. The overlap angle between the waveform 106 and 108 is variable depending upon the voltage level of the quadrature current error signal $e_1$, and for a large value of quadrature current error signal $e_1$ the overlap angle could be a full 180°.

Figure 7B:
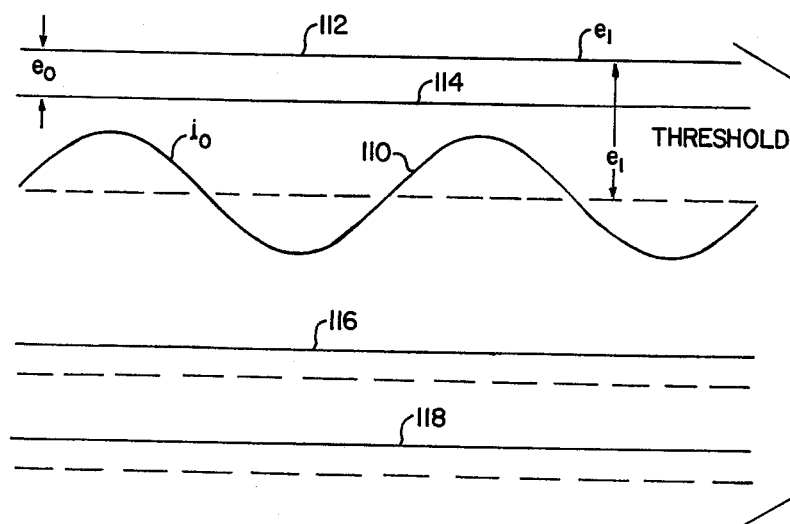

In FIG. 7B, there is shown the output current $i_o$ as represented by the waveform 110. The quadrature current error signal $e_1$ is shown by the voltage 112 above the indicated deadband threshold 114 of the threshod circuit 86. The direct voltage bias $e_o$ is the voltage difference between the quadrature current error signal 112 and the threshold 114. The output signal 116 from the comparator 68 is shown, and the output signal 118 from the comparator 70 is shown.

THE PREFERRED EMBODIMENT OF THE INVENTION WITH TWO CYCLOCONVERTERS INTERLINKING A POWER SYSTEM WITH ANOTHER POWER SYSTEM OR A LOAD

An illustrative practical application of the present invention, in relation to a gas turbine driven transportable ground power supply, is set forth in FIG. 8. A gas turbine 200 running at a substantially constant speed, such as 50,000 rpm, directly drives an electrical generator 202 for producing relatively high frequency output voltage in the order of 850 Hz. This high frequency voltage is converted through a naturally commutated cycloconverter 204, with the equivalent circuit being shown in FIG. 8, to a lower constant frequency output of 60 Hz. The high speed electrical generator 202 could be a permanent magnet synchronous machine or an asynchronous induction generator free from the requirement of producing a magnetic field which rotates synchronously with the rotor. It is well known that an induction generator 202 would require external excitation under all operating conditions and would have to be supplied with an adjustable reactive component of current precisely controlled in accordance with the loading conditions. The controllable input displacement factor of the naturally commutated cycloconverter 204 could provide the desired excitation for the induction generator 202 under varying load conditions. FIG. 8A illustrates the equivalent circuit of the power supply apparatus with full load current flowing at the output of the cycloconverter 204. The power factor viewed at the output terminals of the cycloconverter 204 under this condition is assumed to be unity, and the full load power factor of the induction generator 202 is assumed to be 0.8 lagging. Assuming that under this full load condition no current circulates between the positive and negative banks of the cycloconverter 204 as illustrated by the idealized current waveforms shown in FIGS. 4A through 4D, then the level of lagging reactive current relative to the in-phase component consumed by the cycloconverter 204 is 0.95 p.u. ($r = 0.9$ assumed). The corresponding lagging reactive current $I_q$ consumed by the induction generator 202 is 0.75 p.u., and this fixes the required magnitude of the capacitor current at 0.95 + 0.75 or 1.7 p.u.

Figure 8A:
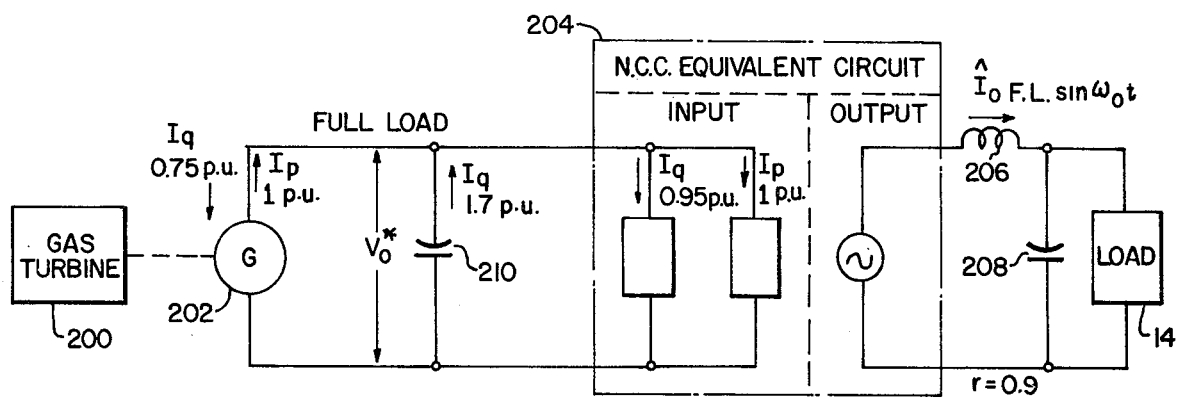
In FIGS. 8A to 8C there are illustrated a practical application of the control circuit of FIG. 6 in relation to a gas turbine driven power supply.
Figure 8B:
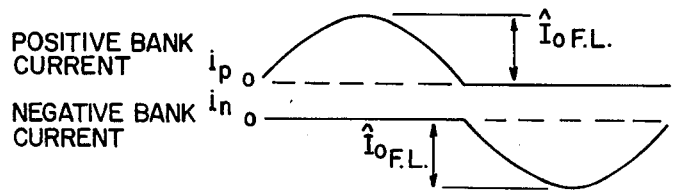
Figure 8C:
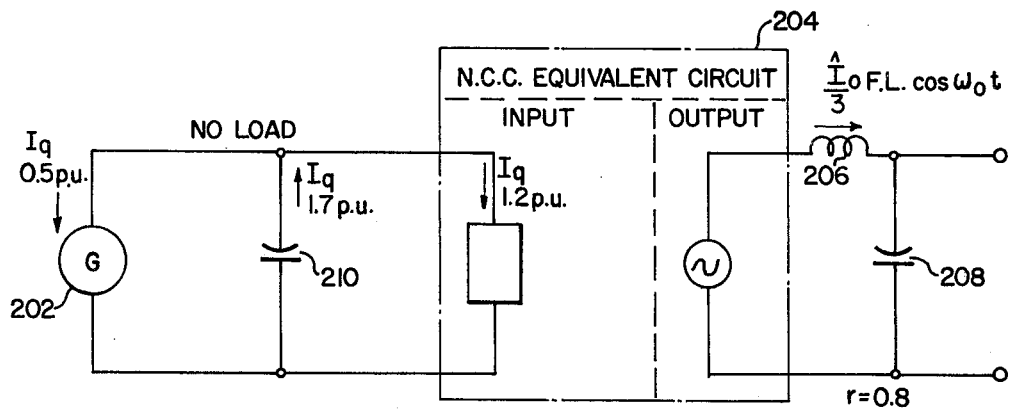
Figure 8D:
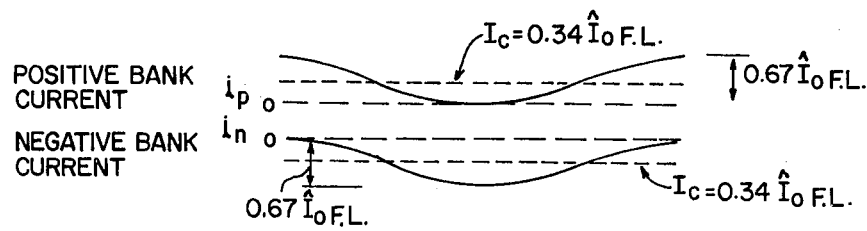

In FIG. 8B, there is illustrated the operation of a similar gas turbine driven transportable ground power supply, with no external load at the output of the cycloconverter 204, such that the L-C filter including the inductor 206 and the capacitor 208 are assumed to draw a purely leading current of one-third the full load value. The reactive current $I_q$ of the induction generator 202 at no-load is assumed to be 0.5 p.u. as compared with 0.75 p.u. at full load. Since the fixed capacitor current through the capacitor 210 would still be 1.7 p.u., this means that the cycloconverter 204 must now be made to consume the quantity 1.7 −0.5 or 1.2 p.u. lagging reactive current. From the above equations (1) and (2), it can be shown that the desired amplitude of direct circulating current $I_c$ should be about 0.34 times the peak full load output current $\hat{I}_{oFL}$. The idealized net current waveforms of the positive and negative bank converters are illustrated in FIG. 8C such that the average loading of the converters is less than the loading at full load. The output voltage $V_o$ of the induction generator 202 would be sensed here for quadrature current magnitude control in relation to a desired output voltage $V_o^*$ for the generator 202.

Figure 9:
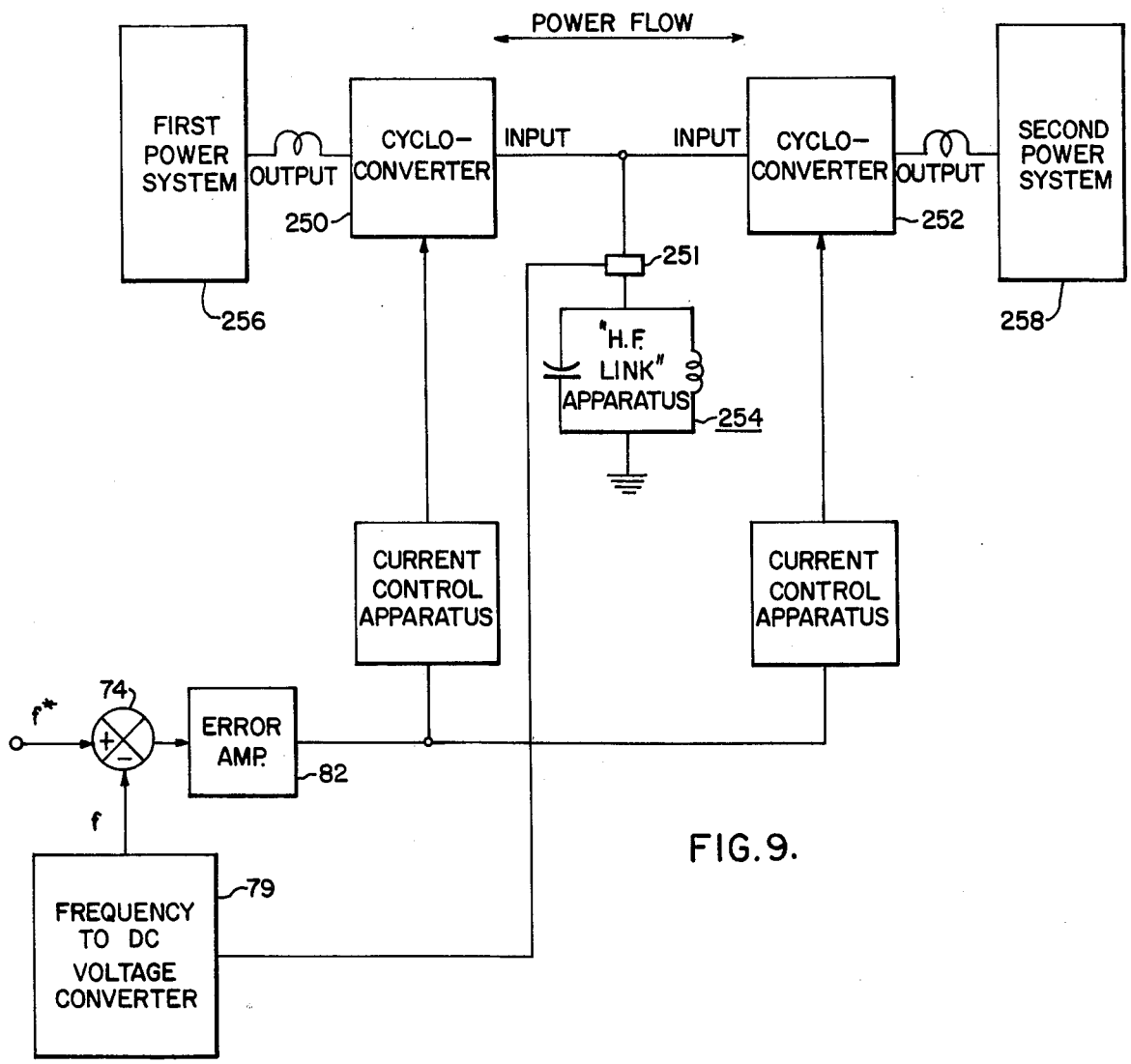
In FIG. 9 there is shown a well known high frequency link power system tie arrangement, including a feedback arrangement for controlling the amplitude of reactive current supplied by the high frequency link apparatus.

As another practical application of the present invention, there is illustrated in FIG. 9 a high frequency link asynchronous power system tie using two cycloconverters 250 and 252 as shown in basic functional form, and operative with a reactive current supplying high frequency link apparatus 254, connected between a first power sysem 256 and a second power system 258. One problem with such a power system arrangement is that as the loading conditions change, the reactive demand on the link circuit apparatus 254 changes. With high current flowing at the cycloconverter output terminals, the high frequency tank circuit 254 must deliver high reactive power to the cycloconverter input terminals. As the system currents decrease, the reactive demand of the cycloconverter when controlled in the conventional manner decreases. The prior art solution proposed for this problem is to allow the link frequency to adjust automatically to the loading conditions to provide a means for controlling the reactive power fed to the cycloconverters from the tank circuit. This solution, however, requires a relatively large tank in order to keep the swing of link frequency between the extremes of loading conditions within acceptable limits.

An improved approach would be to utilize the disclosed principle of the present invention for controlling the reactive input current of the cycloconverter. The circulating current of the cycloconverter would be regulated with changing external load so as to preserve a constant reactive demand on the link apparatus tank circuit. In this manner, the link frequency could be kept substantially constant at all loads, and thus the size of the tank circuit could be minimized.

A voltage transformer 251 is provided to sense the frequency of the power flow between the tank circuit 254 and the two cycloconverters 250 and 252. The frequency to DC voltage converter is a well known apparatus, including logic circuitry to sense the zero crossings of the voltage signal and provide corresponding fixed width pulses which can be averaged to give an output signal proportional to the actual frequency sensed by the voltage transformer 251. This actual frequency $f$ is then compared with a desired frequency reference $f^*$ for controlling the quadrature current relationships of the cycloconverters 250 and 252, as previously described in relation to the current control apparatus shown in FIG. 6. If the frequency of the tank circuit 254 tends to be too low, it is desired that the quadrature currents $I_q$ should increase and vice versa.

Figure 10A:
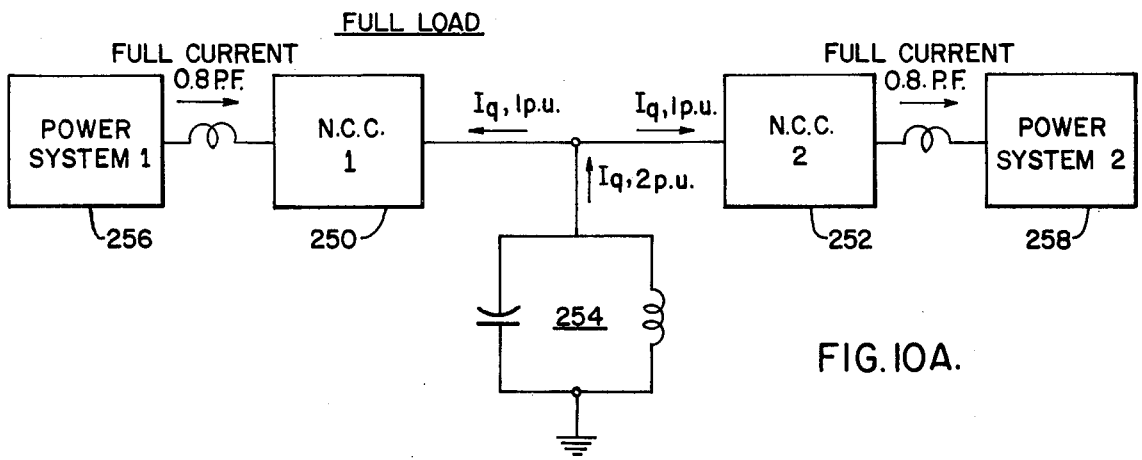
In FIGS. 10A to 10D there is shown a second practical application of the present invention in relation to such a high frequency link power system tie arrangement; and In FIG. 11 there is shown in greater detail the operation of a high frequency link including a tank circuit that can be used in each of the illustrated applications of the invention.
Figure 10B:
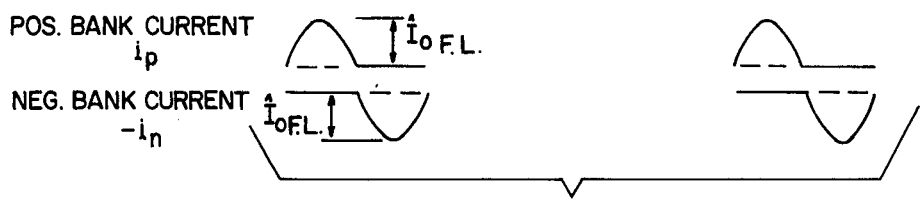
Figure 10C:
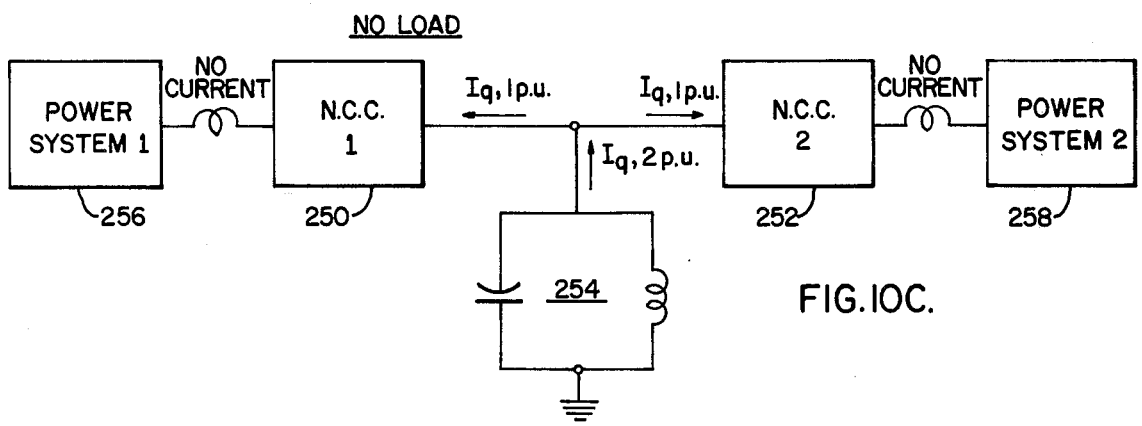
Figure 10D:
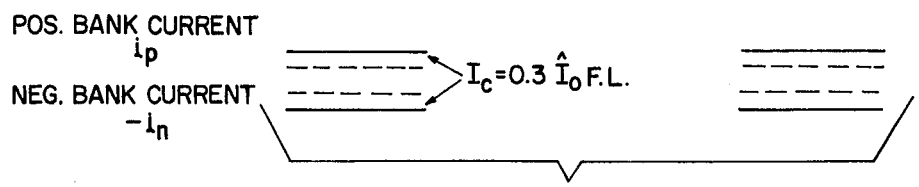

The schematic illustration of FIG. 10A represents the full load condition of operation for such an asynchronous power system tie, with power assumed to be at 0.8 power factor being transmitted from power system 256 to power system 258. Under this condition of operation, the cycloconverters 250 and 252 are assumed to operate with no circulating current as indicated by the idealized waveforms shown in FIG. 10B. The corresponding reactive component of current $I_q$ drawn at the input of each of the cycloconverters 250 and 252 is designated as 1 per unit. Fig. 10C illustrates the no-load condition of operation of such a power system, with no current flowing into or out of either power system 256 or power system 258. In order to keep the link tank frequency the same as at full load, each of the cycloconverters 250 and 252 must still draw 1 per unit reactive current $I_q$ from the tank circuit 254. From the above equation (2), it can be shown that the steady circulating current $I_c$ in each cycloconverter tank should be approximately 0.3 times the peak full load current $\hat{I}_{oFL}$, as illustrated by the idealized waveforms shown in FIG. 10D, assuming $r = 0.9$. Again, it should be clear that the loading of the converters 250 and 252 under no-load conditions is less troublesome than at full load. Thusly, the proposed approach of keeping the tank frequency fixed with changing load conditions will be a practical solution to the problem.

Figure 11:
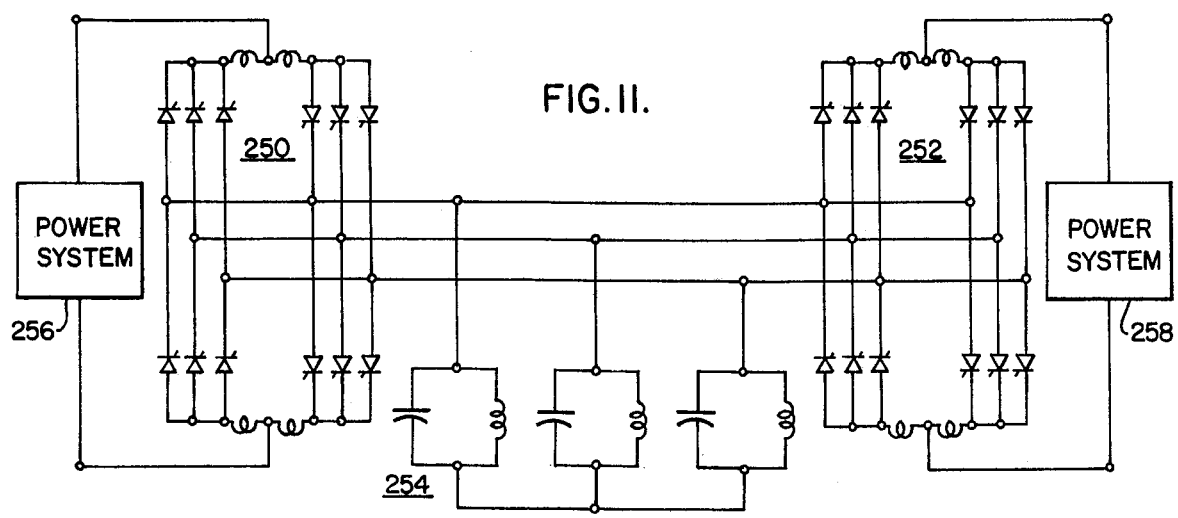

In FIG. 11, there is diagrammatically shown the power system tie of FIG. 9, with the example being for single-phase power systems to simplify the illustration. For three-phase power systems, three of the circuit arrangements shown in FIG. 11 would be required for operation with the same tank circuit 254.

Figure 12:
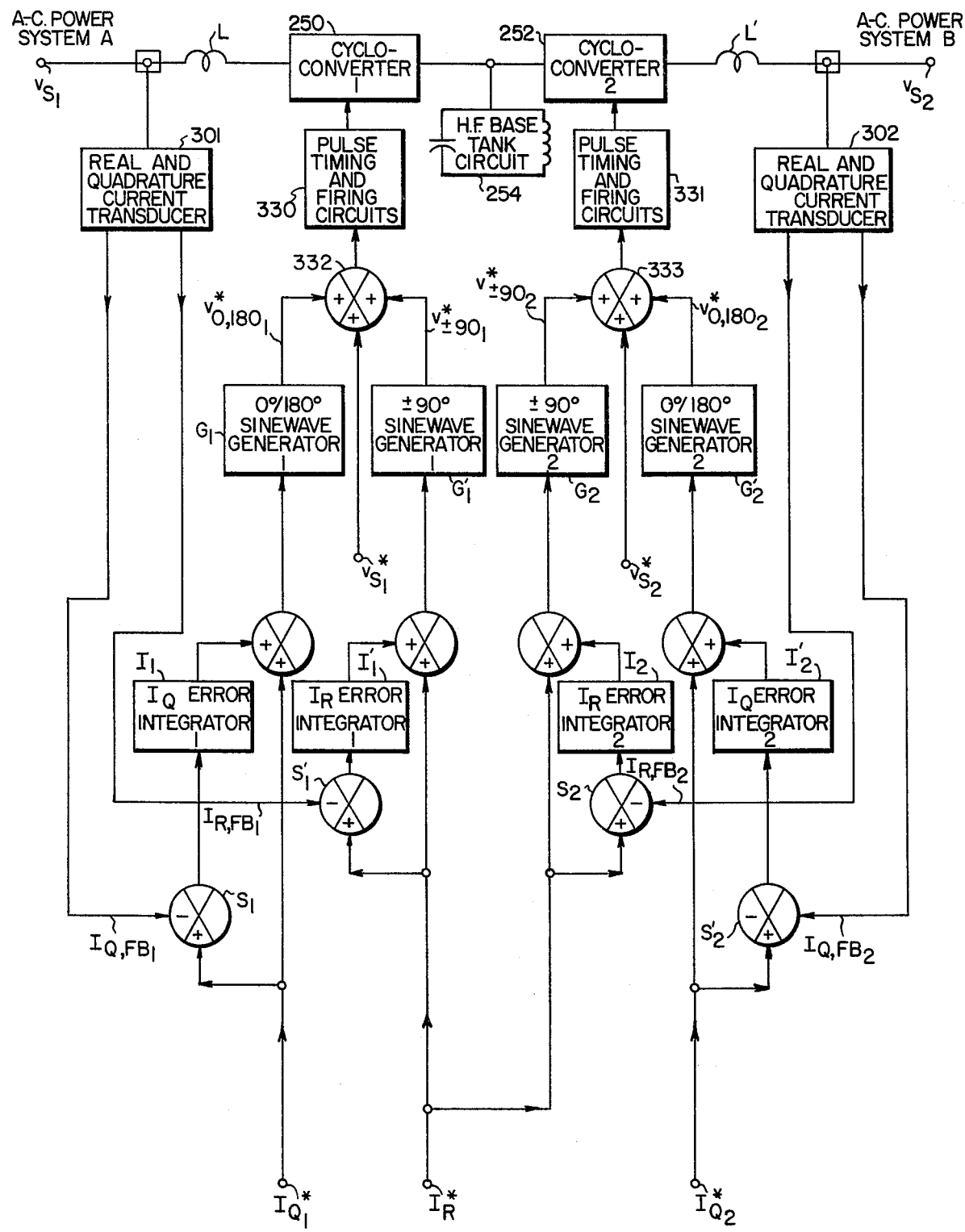
FIG. 12 shows a typical control circuit for controlling power flow in tying arrangement of two power systems.

FIG. 12 shows two naturally commutated cycloconverters 250 and 252 forming an intertie between two power systems A and B and having in common a tank circuit 254, controlled by respective pulse timing and firing circuits 330 and 331. Summers 332 and 333 provide the necessary control signals for the firing circuits 330, 331, respectively. In contrast to the circuit of FIGS. 9 and 11 the circuit of FIG. 12 includes circuitry for regulating power flow between the two power systems A, B through the two cycloconverters, while the previously described circuitry insures that the power factor at either side of the tie can be maintained at unity, or any other desired value.

In order to control power flow between the two power systems, real and quadrature current transducers 301, 302 are respectively provided on the power line of the two systems A and B. From each transducer are derived two signals $I_{Q,FB_1}$, and $I_{R,FB_1}$ representing the actual quadrature and the actual real component for the transducer 301, in the first feedback loop and $I_{Q,FB_2}$, $I_{R,FB_2}$ the actual quadrature and actual real components for transducer 302 in the second feedback loop. These signals are each compared with corresponding reference signals $I_{Q_1}^*$, $I_R^*$, $I_{Q_2}^*$ to provide, after summation in respective summers $S_1$, $S_1'$, $S_2$, $S_2'$, error signals. These error signals after integration (through integrator $I_1$, $I_1'$, $I_2$, $I_2'$) gate sinewave generators $G_1$, $G_1'$, $G_2$, $G_2'$ which, according to the sinewave control method shown on pages 190–192 and 248–254 of the Book of Pelly, determine under voltage reference $V_{S_1}^*$ and $V_{S_2}^*$ the timing of the firing pulses to each cycloconverter.

Thus, the reference voltage for each cycloconverter is made up of three components: $(V_S^*)$, $(V_{O,180}^*)$ and $(V_{\pm 90}^*)$. The first component $V_S^*$ produces a component of voltage at the output of the cycloconverter (250, or 252) which is equal to and in phase with the voltage of the associated system (A, or B). If the two other components are both zero, no current flows at the output terminals of the cycloconverter.

Considering component reference voltage $V_{O,180}^*$ applied to summer 332, or 333, this voltage is either in phase or in anti-phase with $V_S^*$. Thus, variation of the amplitude and sign of this component produces a corresponding variation in the reactive component of current drawn from the system. The action of the feedback loop due to the integrated error between $I_Q^*$ and the actual quadrature component feedback signal is to force the actual system quadrature current to correspond to the reference value $I_Q^*$.

The third component is the one involving real current. The feedback loop involved provides a correction signal in relation to the integrated error between real current reference signal $I_R^*$ and the feedback signal representing the actual real component $I_R$,FB of current flowing in the system. Again, this feedback loop is such as to force the actual real component of current to correspond to the reference value $I_R^*$.

All that is necessary in order to make the real power flowing into one side equal to the real power flowing out of the other is to apply a common real current reference to both cycloconverters, but with opposite polarity. If the voltage of the two power systems are equal at both sides, this will produce the desired equal but opposite power flow at the two sides.

The quadrature currents at each side, on the other hand, are adjusted independently of one another, since they do not contribute any net real power flow through the intertie.

Should the voltages of the power systems not be equal, then it is understood that some circuitry can be added in order to modify the real current reference signals against the difference in voltage between the two sides.

PRIOR ART TECHNIQUES FOR POWER FACTOR GENERATORS IN UTILITY SYSTEMS

The power factor of utility and industrial power lines is usually corrected by rotating synchronous condensers and/or constant or mechanically switched passive capacitor banks. The steady state performance of a rotating synchronous condenser is, under balanced load conditions, excellent: it provides practically sinusoidal and continuously variable leading or lagging three-phase current for the power lines without causing undue transients. However, the synchronous condenser also has a number of disadvantages which hinder its wide application: it is expensive, it has moving parts which need maintenance, its ability to supply unbalanced VAR demand is limited and its response time is slow. Fixed capacitor banks, on the other hand, can provide constant reactive power and, therefore, are only applicable when relatively constant lagging VAR consumption is encountered. To decrease the effect of varying VAR consumption, capacitor banks may be switched mechanically in and out, either individually or in three-phase sets, by suitable contactors. However, the compensation will be slow and it will follow the VAR demand in a step-like fashion. In addition, the switching will, in general, generate transients on the power lines. The recent advancements in high power thyristor technology and electronic circuitry make the concept of solid state power factor correctors more attractive in many practical applications, promising superior technical performance at economic cost.

There are essentially three methods of static VAR generation: (1) shunt capacitors and inductors in conjunction with solid state "on/off" and phase controlled switches; (2) AC/DC converters and inverters; and (3) the more recently conceived AC/AC frequency changers (cycloconverters). An evaluation of these three types of systems indicates that the first group is probably the simplest and least expensive; in addition, this approach is well suited to compensate for unbalanced reactive power consumption. On the other hand, the system is physically large and it represents a resonant type load (with multiple and variable self frequencies) on the power lines. The two other groups are more suitable to compensate for basically balanced three-phase reactive power consumption. The AC/DC converters are economically competitive and physically small. However, they must, in most cases, be complemented with passive filters to provide current waveforms with acceptable distortion. Inverters are generally expensive, but their performance can approximate, or even excel, that of the rotating synchronous condensers. The direct AC/AC frequency changer schemes appear under proper conditions to give a performance generally equivalent and in some respects superior to the rotating counterpart and at a competitive cost.

For power factor correction with thyristor controlled capacitors and inductors, two basic schemes are possible: one is to control the leading VAR by switching stationary capacitor banks to the lines, and the other achieves the same aim by combining a fixed capacitor bank and a parallel thyristor controlled "variable" inductor.

An obvious first method of providing controllable leading VAR for the power lines is to switch in and out appropriately dimensioned capacitor banks with antiparallel connected thyristor switches associated with each capacitor bank.

Figure 13:
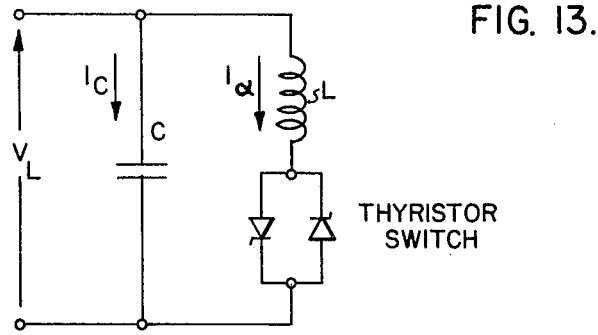
FIG. 13 shows a prior art scheme for power factor correction using fixed capacitor-variable inductor.
Figure 14:
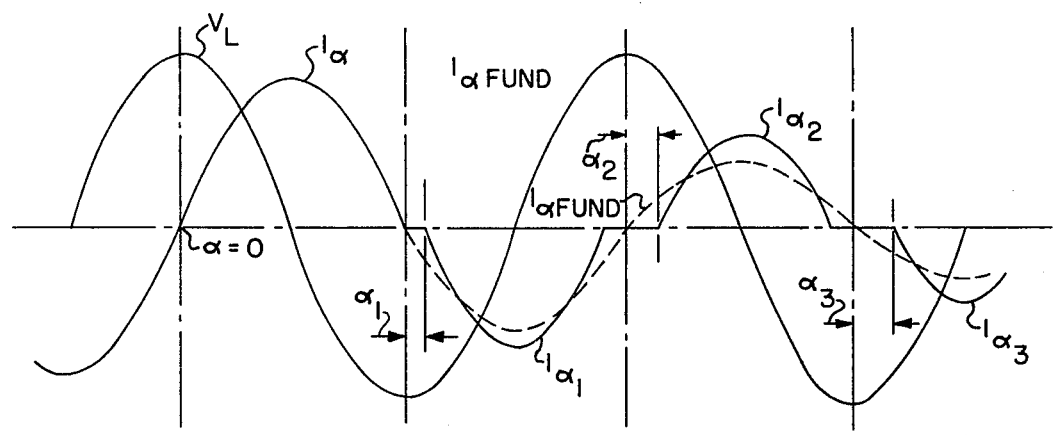
FIG. 14 shows the waveforms illustrating the variation of the inductor current in the circuit of FIG. 12 with varying firing angle.

Another well known system consists of a fixed capacitor in parallel with a variable inductor as shown in FIG. 13. The magnitude of the effective AC impedance of the inductor is controllable between infinity and the absolute value of the impedance of the fixed capacitor. At maximum leading VAR demand, the impedance of the variable inductor is infinity and thus the full capacitive current is drawn from the AC supply. At zero VAR demand, the impedance of the variable inductor is opposite to that of the fixed capacitor and consequently the net current provided is zero. Between these two extreme points, the impedance of the inductor is set so that the resultant capacitive current corresponds to the instantaneous VAR demand. The operation of this basic system may be briefly described as follows:

At zero leading VAR demand, the thyristor switch is closed and the inductor cancels the effect of the capacitor so that the net current provided is zero. At some non-zero leading VAR demand, the closing of the switch is appropriately delayed by a variable angle ("firing angle"), $\alpha$, with respect to the peak of the supply voltage in order to reduce the current in the inductor. With increasing $\alpha$ (0° to 90°), the inductive current decreases, as illustrated in FIG. 14, and, consequently, the leading VAR provided for the AC supply increases. At maximum leading VAR demand, the switch is open ($\alpha = 90°$), the current in the inductor is zero and, therefore, the maximum rated capacitive current is drawn from the AC supply. As stated previously, the fixed reactor in series with phase controlled thyristor switch can be considered as a variable inductor having a response time of one half of a cycle (i.e. angle $\alpha$ can be set at every half cycle).

Power factor correction is also performed conventionally with AC/DC converters and inverters. AC/DC converters may be used for pure reactive VAR generation and thus they may be employed as power factor correctors. A distinction between converter and inverter can be made according to the capability of the static equipment to maintain its AC terminal voltages independently of the AC system to which it is connected. Specifically, the static equipment is called converter if its terminal voltage at the AC side is maintained by the AC system, and it is called inverter if its AC terminal voltage can be maintained and controlled independently of the AC system. With this definition, the direction of the power flow is immaterial; both equipments are capable of absorbing power at the DC terminals and supplying power at the AC terminals, or vice versa. However, it will be seen that in the generation of reactive VA, both the converter and inverter are controlled to absorb the real power needed from the AC system to replenish their internal losses, making it possible to use passive reactive elements (inductors or capacitors) to establish the DC current or voltage required at the DC terminals.

The AC/DC converter may be either naturally or force commutated. The AC/DC inverter, on the other hand, must be force commutated. The naturally commutated converter can only provide lagging VAR; by contrast, the force commutated converter and inverter can provide lagging as well as leading VAR.

Figure 15A:
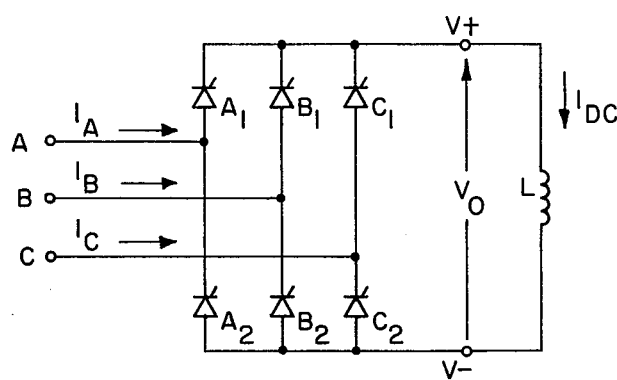
FIG. 15 shows waveforms illustrating the operation of a naturally commutated AC/DC converter in the case of lagging VAR generation.
Figure 15B:
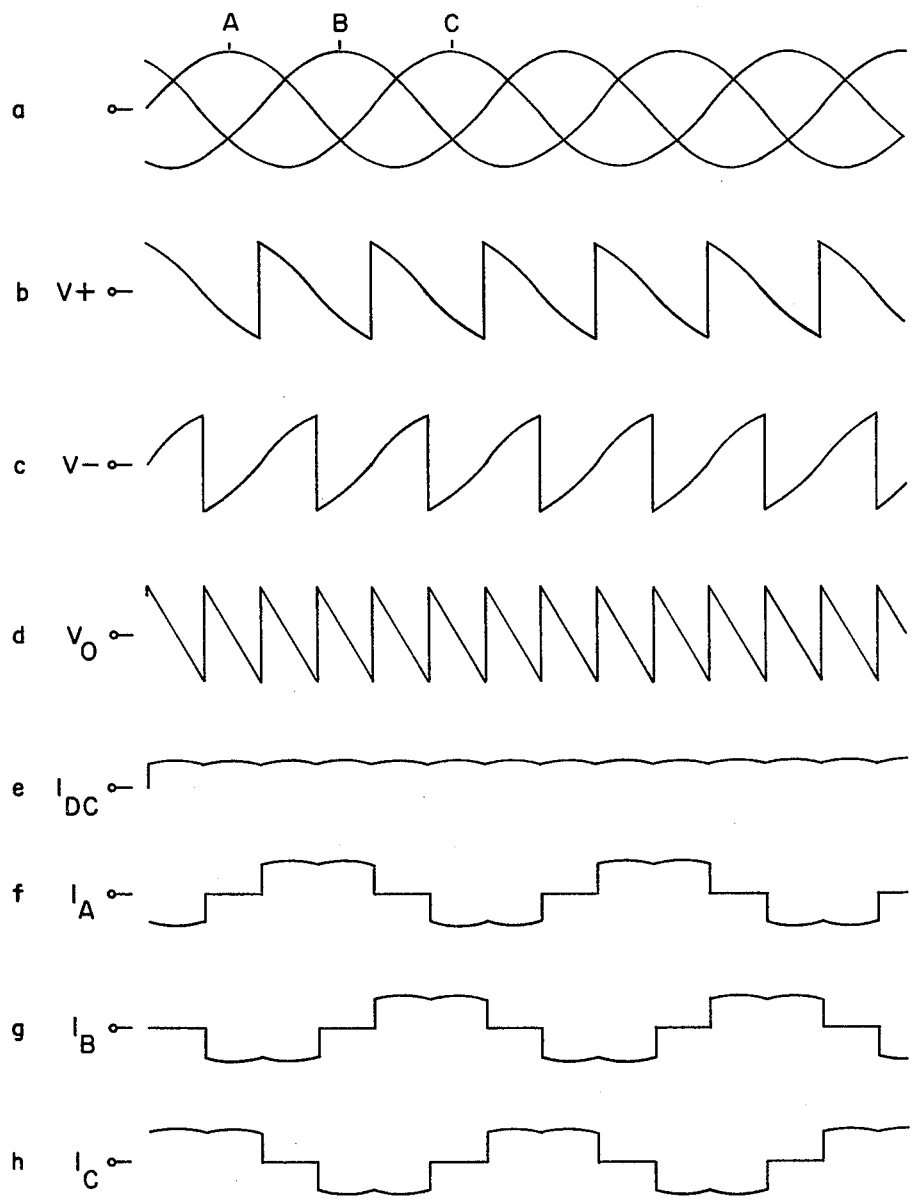

A naturally commutated converter, illustrated in FIG. 15A for one bank, can only operate if the thyristors are fired at phase angles where conduction of the DC current is "naturally" transferred from one pair of thyristors to the next pair. Referring to curves (a) in FIG. 15B, representing load current, commutation can only take place with the indicated polarity of the thyristor from $A_1$ to $B_1$ when line B is more positive than line A. This limits the maximum range for firing thyristor $B_1$ from 0° to −180°, measured from the first point of natural commutation. Consequently, the phase of the AC line current will lag the line voltage by an angle equal to the firing delay angle. Thus, in the application considered, where the converter is to be used to generate purely reactive power, the firing angle has, theoretically, to be −90°. The output DC voltage is, therefore, essentially zero and the converter is terminated by a DC inductor $L_o$. In order to establish and maintain the required DC current level, the firing angle must, of course, be slightly less than 90° so that there is just enough DC voltage $V_o$ to overcome the thyristor drops, and the resistance of the DC inductor. It follows that the magnitude of the DC current and, consequently, the amplitudes of the resultant AC line current $I_A$, $I_B$ and $I_C$ (see curves (f), (g), (h) in FIG. 15B) drawn by the converter are controllable by means of a slight adjustment in the firing angle.

The naturally commutated converter can thus be considered as a reactive current generator, capable of providing three balanced lagging currents of controllable amplitude for the AC lines. It can also be viewed, at the fundamental line frequency, as a continously variable balanced three-phase inductor, capable of compensating for reactive leading power consumption.

Controllable leading VAR can be provided to compensate for lagging power consumption in a manner similar to that discussed earlier. That is to say, the converter, acting as a variable three-phase inductor, is connected in parallel with a three-phase capacitor bank of equal rating. In this way, by controlling the converter current (inductive) between maximum rated and zero, the capacitive current in the lines will vary between zero and maximum.

Force commutated converter schemes are another solution to the problem. However, commutation techniques and circuits create problems of their own.

Figure 16:
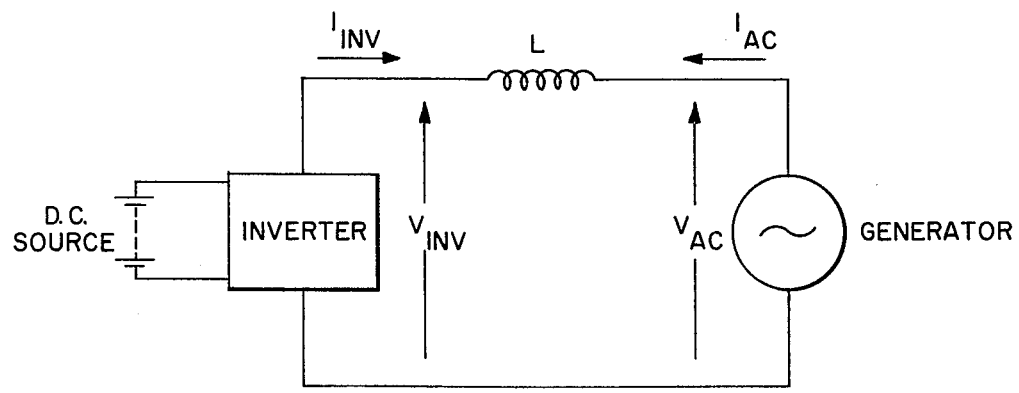
FIG. 16 illustrates the basic scheme for providing reactive power with a static inverter.

With an inverter (in general, regarded as an AC voltage source) a high quality output waveform that closely approximates a sinusoid can be produced. If such an inverter has its output connected through an inductor to an AC source of the same frequency, as shown in FIG. 16, the voltage across the inductor will be the vectorial difference between the voltage produced by the inverter ($V_{inv}$) and that produced by the AC source $V_{AC}$. This voltage difference will cause a current to flow in the inductor ($I_{inv} = -I_{AC}$). If the voltages of the inverter and the AC source are in phase, then the current in the inverter (and in the AC source) will be purely reactive. When the inverter's voltage ($V_{inv}$) is greater than that of the generator $V_{AC}$, then the inverter will effectively "see" an inductive load, while the source will see a capacitive load. If, on the other hand, the inverter's voltage is lower, then it will see a capacitive load while the source sees an inductive load. Thus, by keeping the inverter's voltage exactly in phase with the source voltage while varying its magnitude, the current drawn by the inverter from the AC generator is controllable from full rating inductive to full rating capacitive. If the voltages are exactly in phase, the inverter absorbs no real power from the AC source and thus losses will have to be replenished from a separate DC supply. The DC supply can, however, be dispensed with if a suitable DC reservoir capacitor is used and the phase of the inverter voltage is made to slightly lag that of the AC source. A real power component of current will then flow from the generator to the inverter, and the losses will be compensated for.

The reservoir capacitor of an inverter operating without a DC input will have to carry ripple current of a magnitude and frequency dependent on the power rating, the circuit configuration, operating mode, and the number of AC phases. At any rate, assuming a balanced three-phase system, the amplitude of the ripple current is lower, while its frequency is higher than that of the output current. Thus, the rating of the single DC capacitor needed to furnish a given three-phase reactive current through an inverter, may be a small fraction of the rating of its three-phase AC equivalent capacitor, or inductor.

The inverter operated to generate reactive VA, is analogous to a synchronous capacitor whose internal EMF and leakage inductance determine the magnitude and phase of the reactive current. The inverter can, therefore, be regarded as a "solid state synchronous condensor".

Static frequency changers are the third basic approach to static reactive power generation. In this class of VAR generators, there are two basic approaches both of which may employ naturally or force commutated converters.

In the first scheme, the input and output frequencies are the same and identical to the supply frequency. The main function of the frequency changer is to invert the phase angle of the throughput current with respect to the input and output terminal voltage. This system requires no passive storage components. This scheme has been described in copending U.S. patent application Ser. No. 575,888, filed on May 8, 1975, by L. Gyugyi, J. Rosa and E. J. Stacey, entitled "Static Reactive Power Generating Apparatus".

The second scheme is the concept of a high frequency link used by the present invention.

DESCRIPTION OF THE PREFERRED EMBODIMENT IN THE CASE OF A SINGLE CYCLOCONVERTER USED AS A CONTROLLABLE STATIC REACTIVE POWER GENERATOR

As a result of the availability of high power thyristors (SCR's), solid state power conversion equipment has become a practical reality for electric utility type applications. Due to inherent limitations of these high power thyristors (no gate-controlled turn-off ability, relatively long turn-off time), however, utility type applications are predominantly limited to naturally or input source commutated converters. In these systems, commutation of the thyristors is accomplished by sequential gating, properly phased with respect to the AC source voltages so that the "outgoing" thyristor always receives a reverse bias voltage for a duration of time necessary to recover from conduction. Input source commutated converters are conceptually simple but display some disadvantageous features which become increasingly bothersome at high power levels. They reflect their load with a lagging power factor to the AC source and they draw substantial amounts of relatively low order number harmonic currents from their source. Their response time is keyed to the source frequency. The novel approach according to the present invention preserves the advantages of input source commutated converters, while eliminating their disadvantages.

Figure 17:
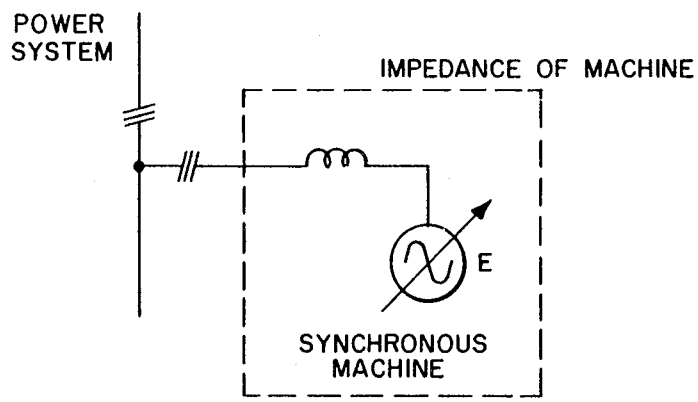
FIG. 17 shows the use of a synchronous machine for power factor correction.

The basic principle of operation of the static reactive power generator according to the present invention is better understood by referring first to the conventional synchronous condenser, as illustrated in FIG. 17, when used to provide controllable reactive power. For purely reactive power flow, the induced EMF E is in phase with the system voltage V. By controlling the excitation of the machine, and hence the amplitude of E, the reactive power can be controlled; increasing E above V causes leading current to be drawn from the system, whereas decreasing E below V produces a lagging load on the system.

Figure 18:
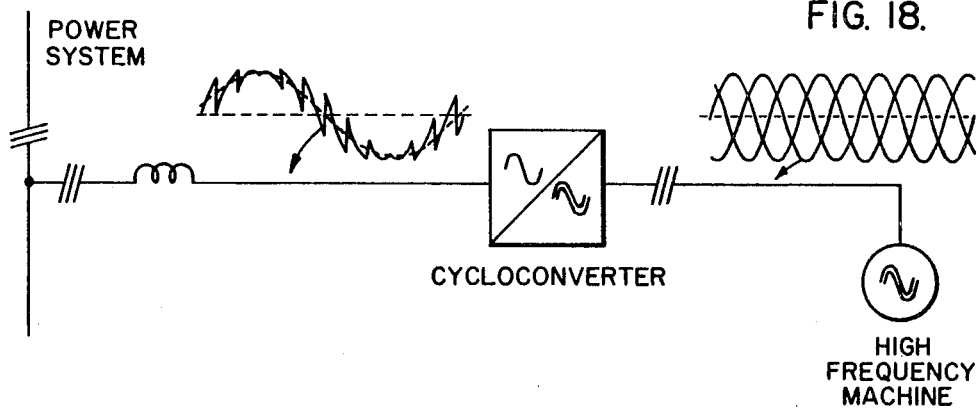
FIG. 18 shows the typical uses of a cycloconverter naturally commutated by a high frequency machine for power factor correction.

An alternative method of implementing a controllable VAR supply is illustrated in FIG. 18. The synchronous condenser of FIG. 16 has been replaced by a relatively high frequency machine, feeding a static cycloconverter, which converts the machine frequency down to the system frequency. The amplitude of the output voltage of the cycloconverter can be controlled to produce either leading or lagging VAR's, either by control of the excitation of the machine, or by internal control of the cycloconverter.

The cycloconverter consists in its basic form simply of a circuit array of thyristors, which, through appropriate control, serves to convert the machine frequency to system frequency. The basic frequency conversion process is illustrated by the waveforms in FIG. 18. Selected segments of the relatively high frequency voltages produced by the machine are pieced together, by appropriate gating of the thyristors within the cycloconverter, to create an output voltage wave with a fundamental frequency equal to the system frequency. By suitable control of the switching periods of the thyristors, the amplitude of the fundamental component of the output voltage of the cycloconverter, relative to the machine voltage, can be controlled; and, by a similar process, the output frequency of the cycloconverter can be held constant at the system frequency against changes in machine frequency. Thus, it is unnecessary for the machine frequency to be held rigidly fixed.

As the reactive current supplied to (or drawn from) the system is varied, through control of the amplitude of the fundamental output voltage of the cycloconverter, this varying reactive power is reflected through the cycloconverter to the machine. However, due to the peculiar transfer properties of the line commutated cycloconverter, both lagging and leading VAR's at the system side always appear as lagging VAR's to the machine.

Figure 19:
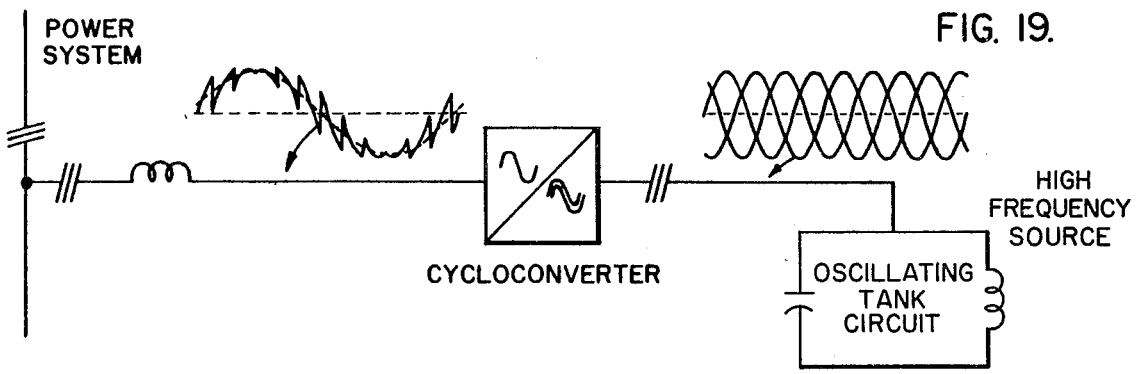
FIG. 19 is the cycloconverter of FIG. 18 but with the use of an oscillating tank circuit rather than a machine as the high frequency source.

Since the machine in FIG. 18 theoretically handles only reactive power, it can be replaced by a static oscillating tank circuit, as shown in FIG. 19. As with the scheme of FIG. 18, control of the reactive power at the system side can be obtained through control of the voltage generated at the output terminals of the cycloconverter, which can be accomplished from within the cycloconverter. The varying reactive load reflected on the tank circuit by the cycloconverter, as the reactive power at the system side is varied, can be accommodated by allowing the oscillating tank frequency to vary appropriately with the loading conditions, whilst the cycloconverter output frequency is held rigidly at the system frequency.

It is clear that the scheme of FIG. 19 constitutes an all-static approach to a continuous VAR controller. It is a naturally commutated system in which the AC source from which the converter commutates is a three-phase high-frequency tank circuit. It should be noted that this is a "three-pulse" system, but comparable results are obtained by using a system of higher (6 to 12) pulse numbers.

Figure 20:
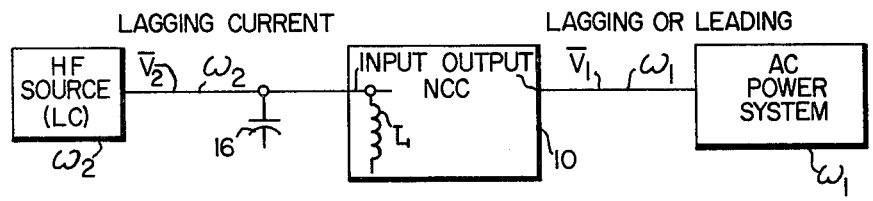
FIG. 20 schematically shows a naturally commutated cycloconverter between a high frequency input power source and an AC power system to provide reactive power correction for the AC power system.

In FIG. 20, there is schematically shown a cycloconverter 10 operatively connected for reactive power correction between an AC power system (of voltage $V_1$ and frequency $\omega_1$) connected at the output of the cycloconverter 10, and a source having a frequency $\omega_2$, higher than the frequency $\omega_1$ of the AC power system, and a voltage $\overline{V}_2$. The thyristors of the cycloconverter are controlled by reference to the output voltage $\overline{V}_1$ of the cycloconverter with a firing pattern corresponding to the frequencies $W_1$ and $W_2$ for commutation by the reactive power input source. Whatever the angle of displacement of the output current with respect to the voltage of the AC power system, the input current of the cycloconverter is always lagging the input voltage. The output displacement angle may be represented by either an inductance (lagging VAR) or a capacitor (leading VAR) at the output. But whatever the nature of the quadrature component of current at the output, the quadrature current component at the input is always lagging. The technique of power factor correction according to the High Frequency Link technique consists in varying the inequality $V_2 < V_1$ or $V_1 < V_2$.

Figure 21:
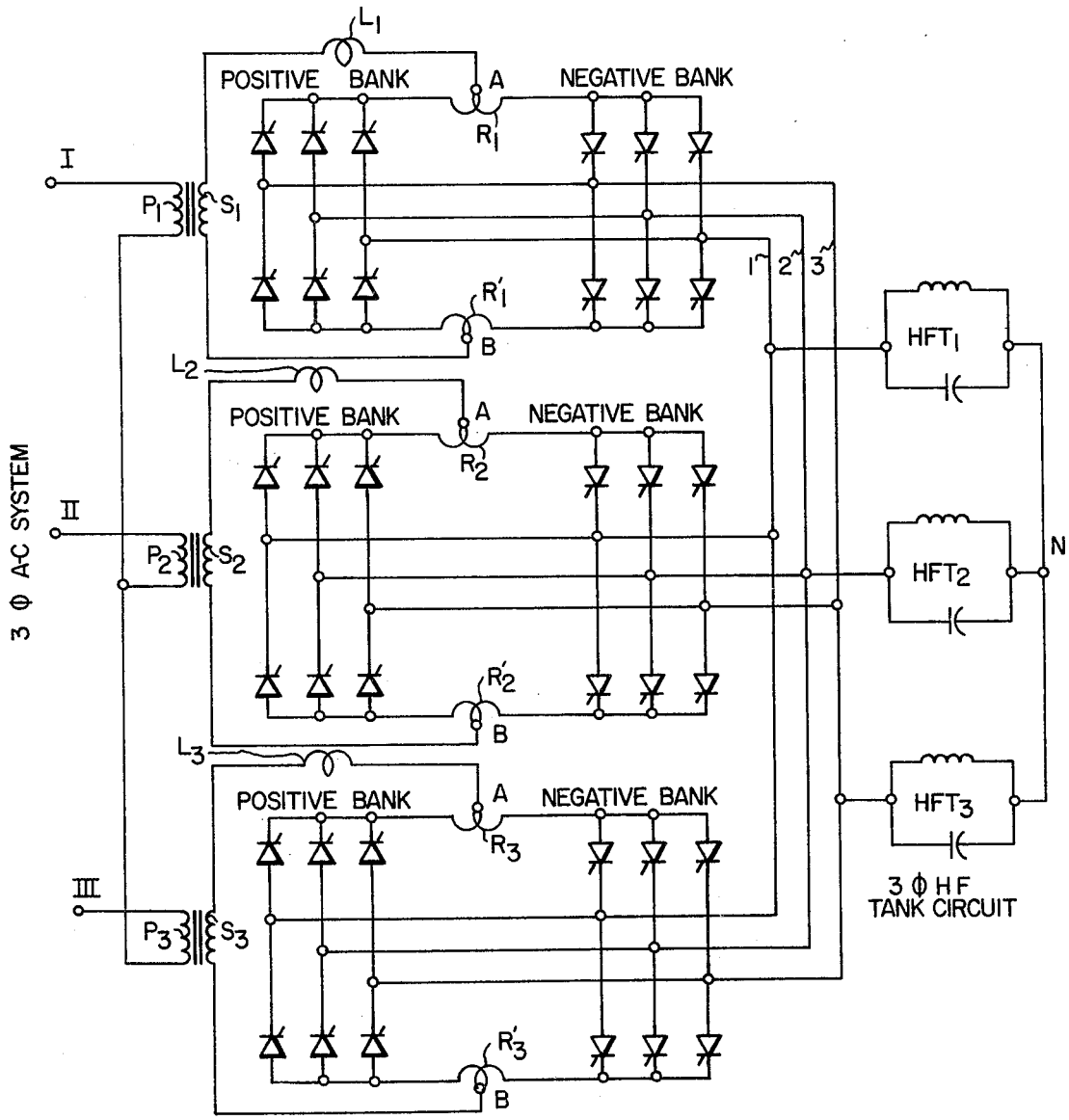
FIG. 21 shows a typical power circuit embodiment of the controllable VAR source according to the invention using a naturally commutated cycloconverter and a high frequency tank circuit.
Figure 22:
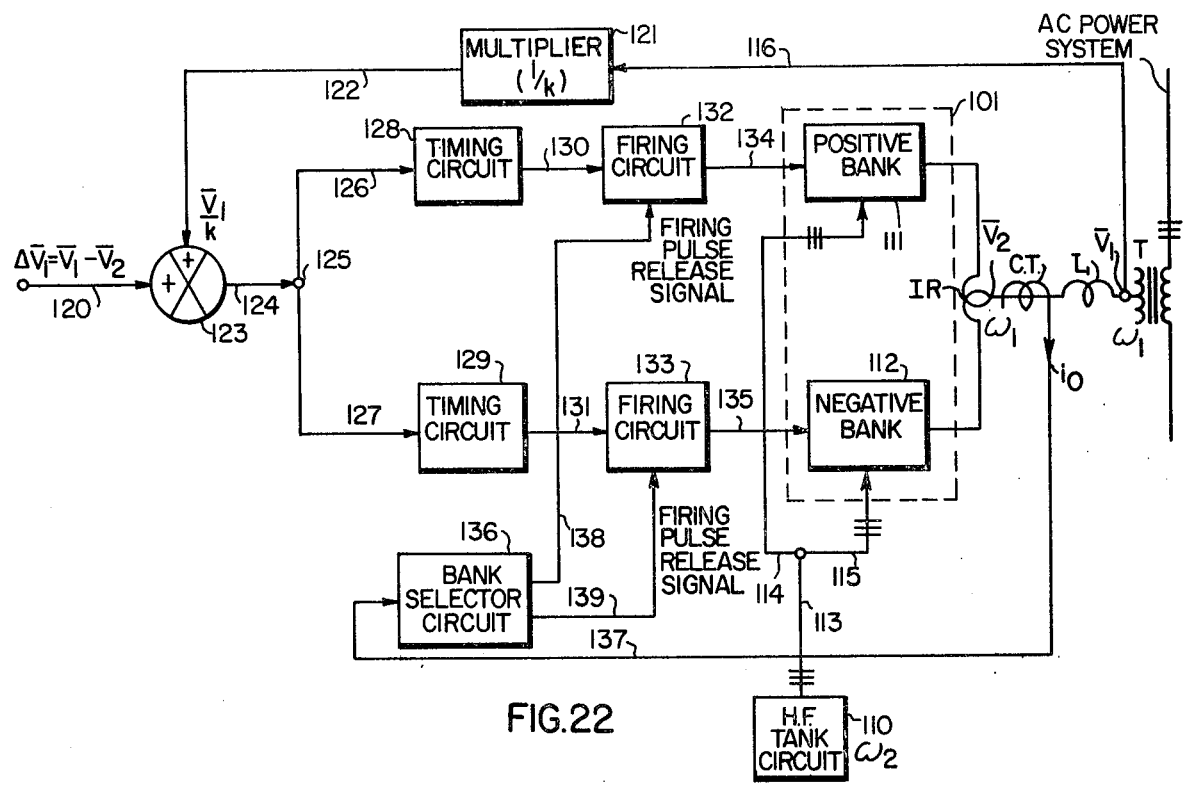
FIG. 22 is a diagrammatic representation of the basic functional scheme for controlling the output voltage of a cycloconverter in order to adjust the displacement angle at the output.
Figure 23:
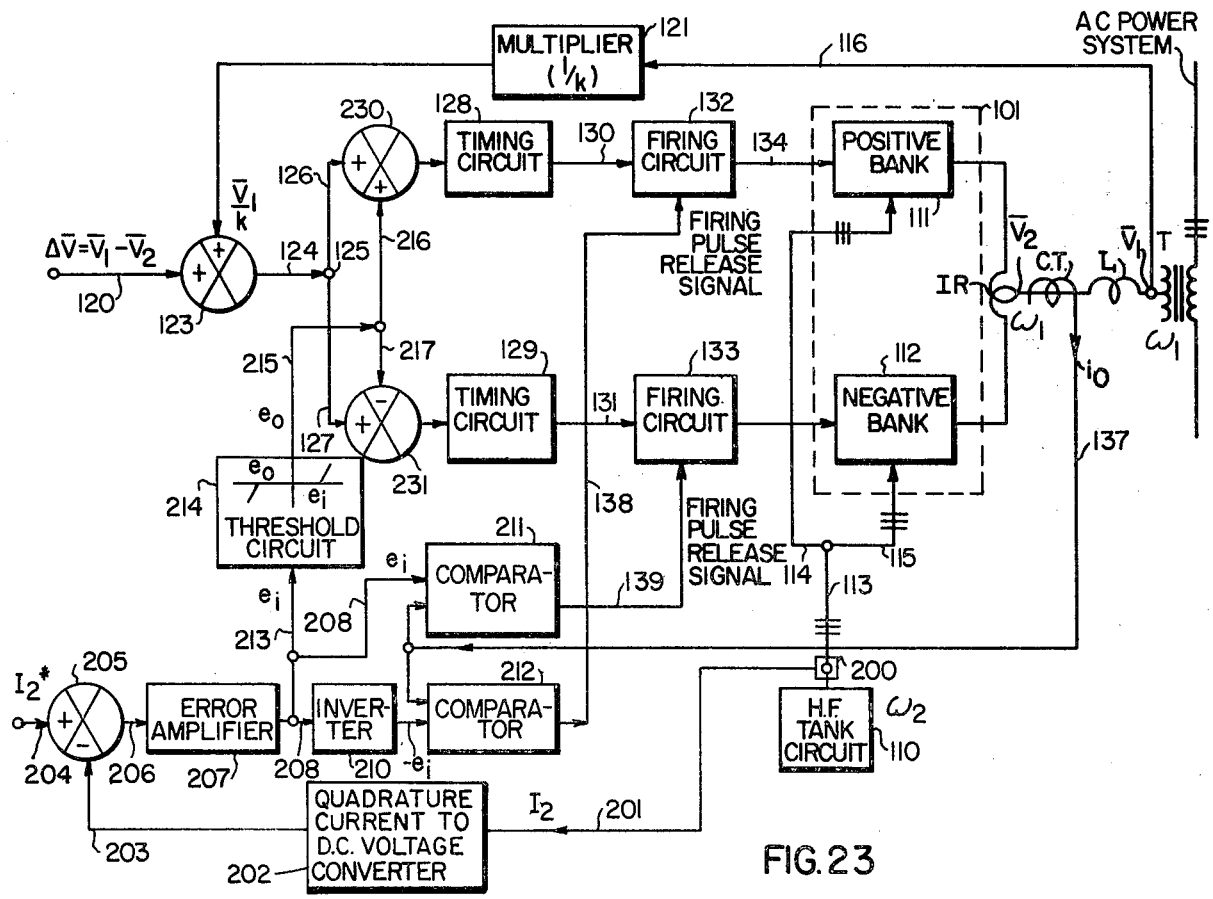
FIG. 23 combines the circuitry of FIG. 22 with automatic control of the frequency of the tank circuit of the high frequency source through control of the circulating current between positive and negative banks of the cycloconverter.

Referring to FIGS. 21, 22 and 23, a new type of static reactive power generator will now be described in detail in which the VAR is automatically supplied to an alternating current power system. This new generator includes an "HF link" which is automatically maintained at a substantially constant frequency, so that in the case of an oscillating tank circuit ("passive" link) the VAR rating can be optimized, and in the case of an external source ("active" link), the HF source can be of a smaller VA rating.

Referring to FIG. 21, a typical three-phase naturally commutated balanced 2-quadrant 6-pulse bridge cycloconverter is shown. Each output phase includes 12 thyristors distributed between two opposite banks. Each input phase combines two pairs of thyristors from each bank and from each of the three dozens of thyristors. The input side, of higher frequency, includes three oscillating tank circuits $HFT_1$, $HFT_2$ and $HFT_3$ which are Wye-connected. The output side, of lower frequency, includes the alternating current power system to be power factor corrected. The power system is coupled at the output through a transformer having, with the three phases I, II, III, a Wye connection at the primary $P_1$, $P_2$, $P_3$ and split secondaries $S_1$, $S_2$, $S_3$, connected at each end to the three respective groups of thyristors through the central tap of a corresponding interphase reactor $R_1$, $R'_1$, $R_2$, $R'_2$ or $R_3$, $R'_3$ between two opposite banks for each direction of flow of the current during conduction. Each of the three tank circuits $HFT_1$, $HFT_2$ and $HFT_3$ is responsive to conduction in either direction for each bank and for the three lines of the AC power system. Thus, when selected thyristors are controlled for conduction, while natural commutation turns off the outgoing thyristors, energy is either accumulated or restituted by the particular tank circuit. In this sustained exchange of energy, the tank circuit operates as an input source for the cycloconverter. At the output side, e.g. at the secondary of the transformer an output voltage is generated having a lower frequency than the tank circuit. The frequency of the tank circuit is such that the frequency at the output matches the frequency of the AC power system. Also, the output voltage is so selected that at the primary of the transformer the voltage is equal to the line voltage of the AC power system.

As explained, when the voltage between terminals A and B of the interphase reactor ($R_1$, $R'_1$, $R_2$, $R'_2$, or $R_3$, $R'_3$) is smaller than the voltage between the winding terminals of the transformer ($S_1$, $S_2$, or $S_3$), considering the small inductance $L_1$, $L_2$ or $L_3$ present between the output to the AC power system and the output from the cycloconverter, inductive reactive currents will flow from the AC power system to the frequency changer output. The currents lead the output voltage of the frequency changer and lag the output voltage of the AC power system. Thus, the frequency changer is capacitively loaded, while the AC power system is inductively loaded.

In the reverse situation, e.g. when the voltage between terminals A and B of the interphase reactor ($R_1$, $R'_1$, $R_2$, $R'_2$ or $R_3$, $R'_3$) is larger than the voltage between the winding terminals of the transformer ($S_1$, $S_2$ or $S_3$), the frequency changer is inductively loaded, while the AC power system is capacitively loaded.

Also, as stated heretofore, in either situation current at the input side is lagging the input voltage, e.g. between neutral terminal N and line 1, 2 or 3.

Indeed FIG. 21 is for the purpose of illustration only. The cycloconverter could have any of the well known configurations such as explained in Pelly's book. Certain arrangements may reduce the number of tank circuits necessary, others may require more such tank circuits.

Referring now to FIG. 22, the cycloconverter, for instance as described in FIG. 21, will now be considered with the adjunction of a voltage controller determining the degree of power factor correction as just explained by reference to the inductances $L_1$, $L_2$ and $L_3$ of FIG. 21.

FIG. 22 shows schematically the basic functional organization for power factor correction in the static reactive power generator according to the present invention when the "HF source" is a tank circuit.

The tank circuit 110, schematic for a plurality of tank circuits which may be necessary depending on the particular polyphase arrangement of thyristors, is coupled to the input of the cycloconverter 101 including two banks 111, 112, also schematically representing any combination of thyristors associated with one or the other polarity. Similarly, an interphase reactor IR is schematically represented between the outputs of the positive and negative banks, the center tap of which is connected to the secondary of transformer T coupling the output of the cycloconverter to the AC power system to be corrected. A small inductance L is present in the cycloconverter output between the secondary of transformer T and the tapping point of reactor IR, which inductance, as shown in FIG. 20, separates the point at the cycloconverter output voltage $\overline{V}_2$ from the point at voltage $\overline{V}_1$ of the AC power system. These two potentials have a difference $\Delta \overline{V}_1 = \overline{V}_1 - \overline{V}_2$ which is positive when the cycloconverter consumes lagging VAR's from the AC power system, and which is negative when the cycloconverter delivers lagging VAR's that is, it consumes leading VAR's from the system.

The control circuitry shown in FIG. 23 causes the cycloconverter to generate, in response to a control signal $$\Delta \overline{V}_1 = V_1 - V_2$$

derived on line 120 and applied to summer 123, output voltage $\overline{V}_2$ which is as required for power factor correction in the AC power system. Control of the output voltage of a cycloconverter is well known. See for instance pages 190–192 and 248–254 of the Book of Pelly. Referring to FIG. 21, in normal operation, three substantially equal sinusoidal voltages, mutually displaced by 120°, are developed across the three tank circuits. The timing of the firing pulses to each cycloconverter is controlled with respect to the high frequency tank voltages so that each cycloconverter fabricates a fundamental component of voltage across its ouput terminals A, B, which is substantially in-phase with the voltage applied from the connected system across the associated transformer secondary winding In order to consume lagging VAR's from the system, the amplitude of the wanted component of cycloconverter output voltage is made less than the corresponding applied transformer secondary voltage, through appropriate control of the timing of the firing pulses in response to a control signal $i_o$ derived from a current transformer CT at the output of the cycloconverter. In order to deliver lagging VAR's to the system, i.e., to consume leading VAR's, the amplitude of the cycloconverter output voltage is made appropriately greater than the corresponding transformer secondary voltage.

Referring again to FIG. 22, the alternating reference voltage $\Delta \overline{V}_1$ is synchronized and in phase with the system voltage appearing across the associated transformer secondary. With $\Delta \overline{V}_1 = 0$, the fundamental output voltage $\overline{V}_2$ of the cycloconverter is exactly equal to the corresponding transformer secondary voltage $V_1$, the voltage $\overline{V}_1/k$ being fed back via lines 122 and 124 as the only input to the cycloconverter pulse timing circuits 128, 129, and no fundamental current flows ($k =$ voltage gain between the inter-phase reactor IR connecting point and summer 123). When the polarity of $\Delta \overline{V}_1$ is such as to aid the feedback signal $\overline{V}_1/k$, the cycloconverter delivers lagging reactive volt-amperes to the connected system. With the opposite polarity of $\Delta \overline{V}_1$, the opposite is true. In this basic scheme, as the external reactive load changes, the reactive current demand of the cycloconverters on the tank circuit varies, and the operating frequency of the tank circuit changes accordingly.

The operation of the circuitry of FIG. 22 is readily understood from the general information found in the Book of Pelly. The two banks of thyristors 111 and 112 are controlled by firing circuit 132 for the positive polarity and by firing circuit 133 for the negative polarity. From the current sensed at the output of the interphase reactor IR, bank selector 136 determines which bank is to be fired at a given time. The instant of firing is determined for each thyristor by the congruence in time between the reference signal at the frequency $\omega_1$ and the sinusoidal curve at frequency $\omega_2$ of the particular phase from the HF tank circuit 110, as received on lines 113, 114 and 113, 115 for the respective banks. The timing circuits 128, 129 establish the duration of conduction of the oncoming thyristor in relation to the control signal $\Delta \overline{V}_1$ on line 120.

Referring now to FIG. 23, circuitry is shown combining output voltage control such as shown in FIG. 22, for automatic power factor correction, with control of the circulating current between the two banks of the cycloconverter so as to correct automatically for changes in the equivalent inductance seen from the input of the cycloconverter and therefore maintain operative oscillation between the cycloconverter and the HF tank circuit at the selected and desired frequency $\omega_2$.

The circulating current control circuit includes a detector device 200 operatively connected to line 113, e.g. where energy is exchanged between the HF tank circuit 110 and the cycloconverter banks 111, 112.

Detector device 200 senses the quadrature current $I_q$ at the output of the tank circuit as an indication of the variations in the equivalent inductance seen from the input of the cycloconverter.

A quadrature current reference signal $I_q*$ is applied to terminal 204 according to the desired quadrature current $I_q$. The summing junction 205 compares the desired quadrature current reference $I_q*$ with the actual quadrature current $I_q$ signal derived on line 203 from the quadrature current to DC voltage converter 202, for establishing an error signal $e_i$. The error signal $e_i$ after amplification by high gain amplifier 207 is applied to comparator 211 for controlling the negative bank 112 and also passes through inverter 210 and comparator 212 for controlling the positive bank 111. The control technique making use of comparators 211, 212 and firing circuits 132, 133 in relation to banks 111 and 112 is in accordance with the technique shown on pages 250 and 251 of the Book of Pelly.

In addition, the DC bias voltage error signal $e_i$ is gated by a threshold circuit 214 so that when it is above a predetermined threshold level, $e_i$ is applied via lines 215, 216, and 215, 217 to the respective summing junctions 230 and 231 for controlling the operation of the respective timing circuits 128 and 129, and thereby the operation of the respective positive bank 111 and negative bank 112.

A controlled firing pulse overlap is provided by the operation of comparators 211 and 212, until a full overlap of the firing pulses has been reached. Then, the threshold circuit 214 becomes operative to introduce a direct voltage bias between the two banks 111 and 112 for additional control of the converter operation. The threshold circuit 214 provides a deadband such that no ouput is obtained from the threshold circuit until after the firing pulse overlap control of comparators 211 and 212 is completed to provide additional quadrature current. The direct voltage bias from the threshold circuit 214 when applied to the respective summing junctions 230 and 231 increases the magnitude of the circulating current beyond the level of just continuous operation until an equilibrium is obtained with the desired quadrature current being supplied as the control system operation becomes stabilized. It should be noted that the gain of the error amplifier can be made high enough to include if desired, some integration factor so that an ouput signal will be provided by the threshold circuit 214 even when practically a zero error (in the order of one-half percent or so) condition of operation is obtained. When the cycloconverter is functioning in the just-continuous condition of operation, as earlier explained by reference to FIGS. 4E to 4H, e.g. with 100 percent overlapping firing pulses and both converters conducting all of the time, if it is desired to provide an additional circulating current the amplitude of the circulating current can be increased by providing a DC bias voltage.

In accordance with the present invention, there has been disclosed apparatus including one, two, or more, cycloconverters naturally commutated which have a circulating current established and controlled so as to keep the input current lag at a predetermined value despite affecting load conditions at the output.

We claim:

1. In a static frequency changer apparatus including positive and negative banks of controllable rectifiers operative between input and output terminals with at least one alternating current power system of lower frequency at said output terminals and with an alternating voltage source of higher frequency at said input terminals for natural commutation thereof; with said one power system having variable power load conditions; with said voltage source having a selected VA rating and frequency and generating a quadrature input current at said input terminals lagging the input voltage thereof by an amount of lag in relation to said variable load conditions; the combination of:
   signal means for sensing a condition representative of said quadrature input current to derive a control signal;
   control means responsive to said control signal for controlling said controllable rectifiers to generate between said positive and negative banks a circulating current of such amplitude as to maintain said quadrature input current lag to a predetermined amount.

2. The apparatus of claim 1, including first and second frequency changers each having positive and negative banks of controllable rectifiers operative between corresponding said input output terminals; with said one power system being connected at the output terminals of said first frequency changer, with the provision of another alternating current power system connected at the output terminals of said second frequency changer, said another power system having variable power load conditions;
   with said voltage source generating a first and a second said quadrature input current at the respective input terminals of said first and second frequency changers, each having a lag in relation to the power load conditions of the associated power system;
   with said signal means sensing the respective said quadrature input currents to derive corresponding control signals;
   with said control means being responsive to said control signals and operative with said first and second frequency changers to generate between positive and negative banks of rectifiers in each frequency changer a corresponding said circulating current of such amplitude as to maintain the lag of the corresonding quadrature input current to a corresponding predetermined amount.

3. The apparatus of claim 1, including first and second frequency changers each having positive and negative banks of controllable rectifiers operative between corresponding said input and output terminals; with said one power system being connected at the output terminals of said first frequency changer, with the provision of a load connected at the output terminals of said second frequency changer, said load having variable power load conditions;
   with said voltage source generating a first and a second said quadrature input current at the respective input terminals of said first and second frequency changers, each having a lag in relation to the power load conditions of the associated one of said power system and said load;
   with said signal means sensing the respective said quadrature input currents to derive corresponding control signals;
   with said control means being responsive to said control signals and operative with said first and second frequency changers to generate between positive and negative banks of rectifiers in each frequency changer a corresponding said ciirculating current of such amplitude as to maintain the lag of the corresponding quadrature input current to a corresponding predetermined amount.

4. The apparatus of claim 1 with said representative condition being derived by sensing the quadrature input current supplied by said source.

5. The apparatus of claim 1 with said representative condition being derived by sensing the input frequency supplied to the input terminals of said apparatus.

6. The apparatus of claim 1 with said source consisting of tuned inductance-capacitance tank circuit means at said selected VA rating and frequency.

7. The apparatus of claim 1 further including means responsive to a representation of said variable power load conditions for timing the operation of said controllable rectifiers for modifying the output voltage of said apparatus in relation to the output voltage of said power system to compensate for power factor variations in said power system.

8. The apparatus of claim 2 further including means responsive to a first and a second representation of said reactive power load conditions in said one and another power systems for timing the operation of the controllable rectifiers of said first and second frequency changers, respectively for modifying the output voltage at the respective output terminals in relation to the corresponding output voltage of the associated one of said power systems to compensate for power factor variations in such associated power system.

9. The apparatus of claim 8 further including means associated with said first and second frequency changers for maintaining the phase angle of the output current relative to the output voltage at the output terminals of one frequency changer equal and opposite to the phase angle of the output current relative to the output voltage at the output terminals of the other frequency changer, thereby to control flow of real power between said power systems through said first and second frequency changers.

10. The apparatus of claim 3 further including means responsive to a first and a second representation of said power load conditions in said power system and said load for timing the operation of the controllable rectifiers of said first and second frequency changers, respectively for modifying the output voltage at the respective output terminals in relation to the corresponding output voltage of the associated one of said power system and load to compensate for power factor variations in such associated one of said power system and load.

11. The apparatus of claim 10 further including means associated with said first and second frequency changers for maintaining the phase angle of the real component of the output current relative to the output voltage at the output terminals of one frequency changer equal and opposite to the phase angle of the real component of the output current relative to the output voltage at the output terminals of the other frequency changer, thereby to control flow of real power between said power system and said load through said first and second frequency changers.

12. A reactive power generator for supplying variable reactive power to an alternating current power system of a given voltage and frequency comprising:

static frequency converter means having controllable rectifier means, a converter input current, a converter input voltage, a converter output current and a converter output voltage, the frequency of said converter input current being higher than the frequency of said converter output current, said frequency converter means being coupled to said power system, said converter output voltage being substantially equal to said power given voltage, said converter output frequency being equal to said power system frequency, said frequency converter means being naturally commutated by said power system, means for generating said input current and said input voltage at said input frequency; and means controlling the operation of said rectifier means of said frequency converter means for concurrently (a) adjusting said converter output voltage in relation to said power system voltage to correct the power factor of said power system and (b) establishing a circulating current within said frequency converter means of such a magnitude to maintain the lagging quadrature current in said converter input at a predetermined value to compensate for said variable reactive power in said power sytem, whereby natural commutation of said converter means with said generating means occurs at a selected value of said converter input frequency.

* * * * *